(12) United States Patent
Ogura et al.

(10) Patent No.: US 9,386,539 B2
(45) Date of Patent: Jul. 5, 2016

(54) WIRELESS COMMUNICATION APPARATUS AND METHOD

(71) Applicant: KABUSHIKI KAISHA TOSHIBA, Minato-ku, Tokyo (JP)

(72) Inventors: Koji Ogura, Tachikawa Tokyo (JP); Tsuyoshi Kogawa, Kawasaki Kanagawa (JP); Tomoya Tandai, Tokyo (JP); Ryoko Matsuo, Tokyo (JP); Tomoko Adachi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/574,108

(22) Filed: Dec. 17, 2014

(65) Prior Publication Data

US 2015/0181537 A1 Jun. 25, 2015

(30) Foreign Application Priority Data

Dec. 19, 2013 (JP) .................................. 2013-262688

(51) Int. Cl.
*H04W 52/24* (2009.01)
*H04B 17/327* (2015.01)

(52) U.S. Cl.
CPC ........... *H04W 52/243* (2013.01); *H04B 17/327* (2015.01); *H04W 52/24* (2013.01)

(58) Field of Classification Search
CPC ........................... H04W 52/243; H04B 17/327
USPC ............... 455/522, 69, 517, 63.1, 67.13, 501, 455/452.2
See application file for complete search history.

(56) References Cited

U.S. PATENT DOCUMENTS

| | | | |
|---|---|---|---|
| 6,990,117 B1 | 1/2006 | Tanaka et al. | |
| 2007/0183392 A1 | 8/2007 | Tandai et al. | |
| 2008/0146263 A1* | 6/2008 | Shiouchi | H04W 74/0808 455/517 |

(Continued)

FOREIGN PATENT DOCUMENTS

| | | |
|---|---|---|
| JP | 2001156710 A | 6/2001 |
| JP | 2007067472 A | 3/2007 |

(Continued)

OTHER PUBLICATIONS

Japanese Office Action (and English translation thereof) dated Mar. 3, 2015, issued in counterpart Japanese Application No. 2013-262688.

Japanese Office Action dated Dec. 9, 2014, issued in counterpart Japanese Application No. 2013-262688.

*Primary Examiner* — John J Lee
(74) *Attorney, Agent, or Firm* — Holtz, Holtz & Volek PC

(57) ABSTRACT

According to one embodiment, a wireless communication apparatus includes a transceiver, an estimator and a controller. The transceiver transmits and receives a frame in a frequency band which is used by a first system executing communication in a first communication range determined by a first transmission power and a first antenna gain. The estimator determines whether an amount of interference in the frequency band from a second system is no less than a threshold, the second system executing communication in a second communication range which is larger than the first communication range and which is determined by a second transmission power and a second antenna gain. The controller increases a transmission power when the amount of interference is no less than the threshold.

20 Claims, 21 Drawing Sheets

(56) References Cited

U.S. PATENT DOCUMENTS

| | | |
|---|---|---|
| 2009/0109943 A1 | 4/2009 | Yomo et al. |
| 2012/0082038 A1* | 4/2012 | Xu ............... H04J 11/0023 370/244 |
| 2012/0195296 A1 | 8/2012 | Adachi et al. |
| 2013/0051318 A1* | 2/2013 | Matsuo ............ H04B 15/02 370/328 |
| 2013/0051335 A1 | 2/2013 | Adachi et al. |
| 2013/0170360 A1* | 7/2013 | Xu ............... H04J 11/0023 370/241 |

FOREIGN PATENT DOCUMENTS

| | | |
|---|---|---|
| JP | 2007214819 A | 8/2007 |
| JP | 2008153807 A | 7/2008 |
| JP | 2012160895 A | 8/2012 |
| JP | 2013046314 A | 3/2013 |
| JP | 2013046354 A | 3/2013 |

\* cited by examiner

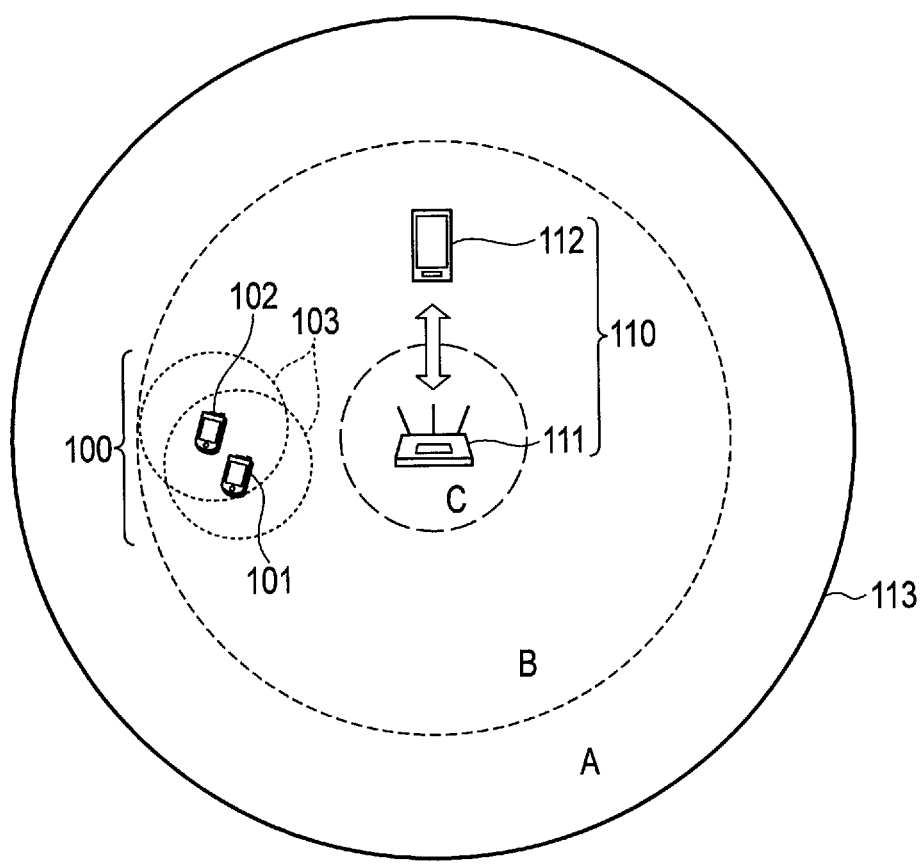
F I G. 1

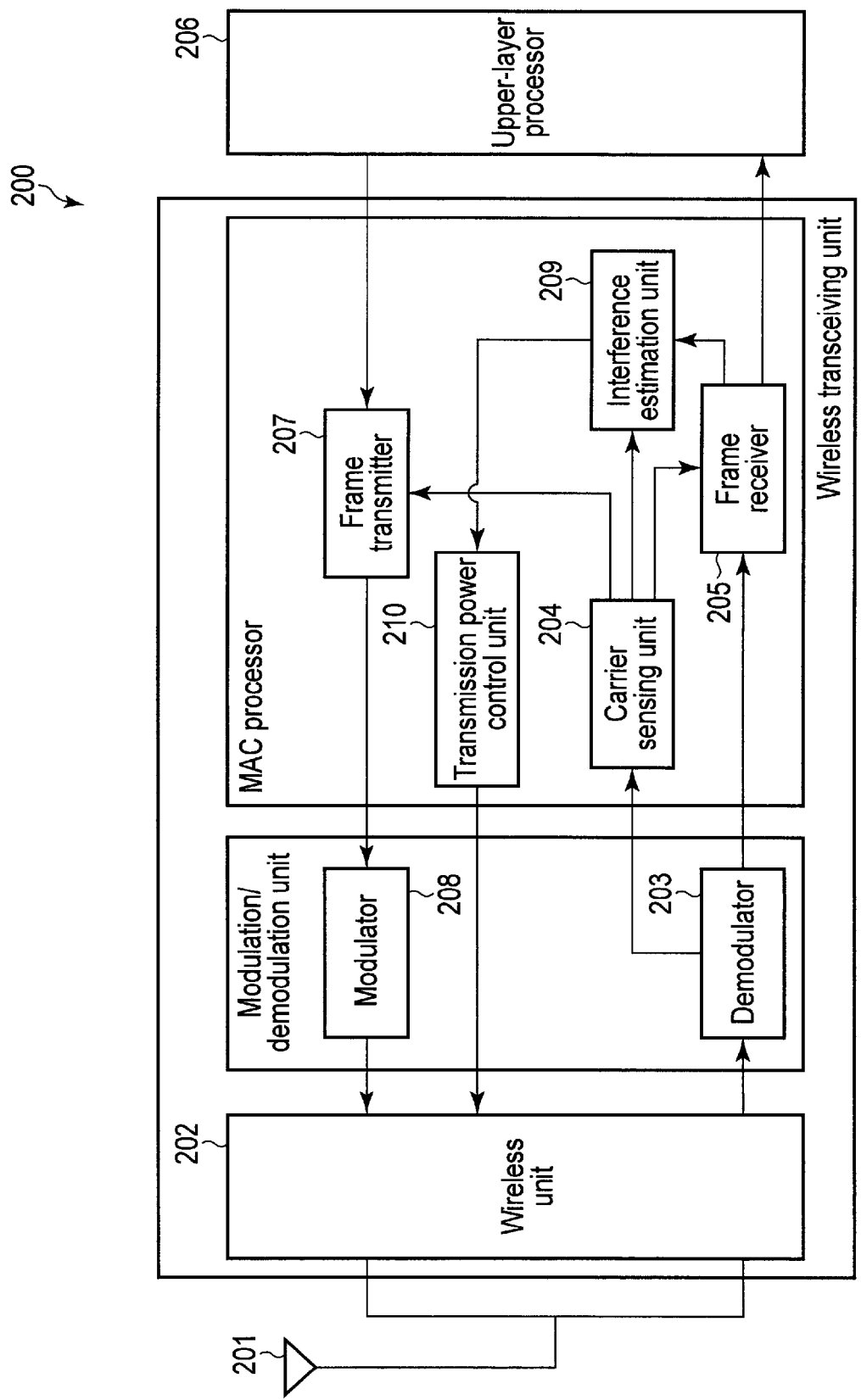
F I G. 2

| | Case A (Area A) | Case B (Area B) | Case C (Area C) | Case D (Large distance between apparatuses) |
|---|---|---|---|---|
| 401 — Carrier busy ratio | Low | High | High | Low |
| 402 — Frame error ratio | Low | High | Low | High |
| 403 — Transmission power | Normal | High | Normal | Normal |

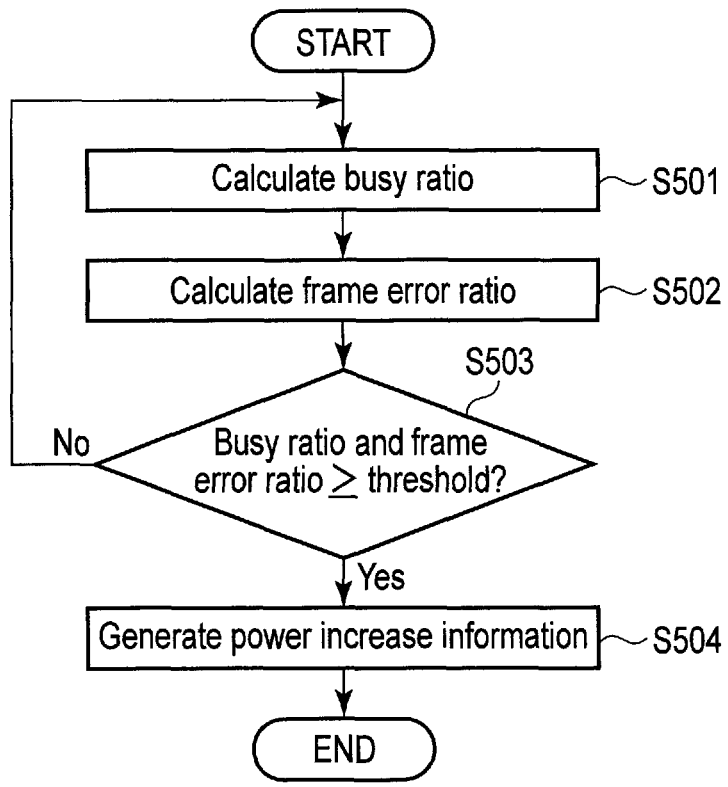
F I G. 5

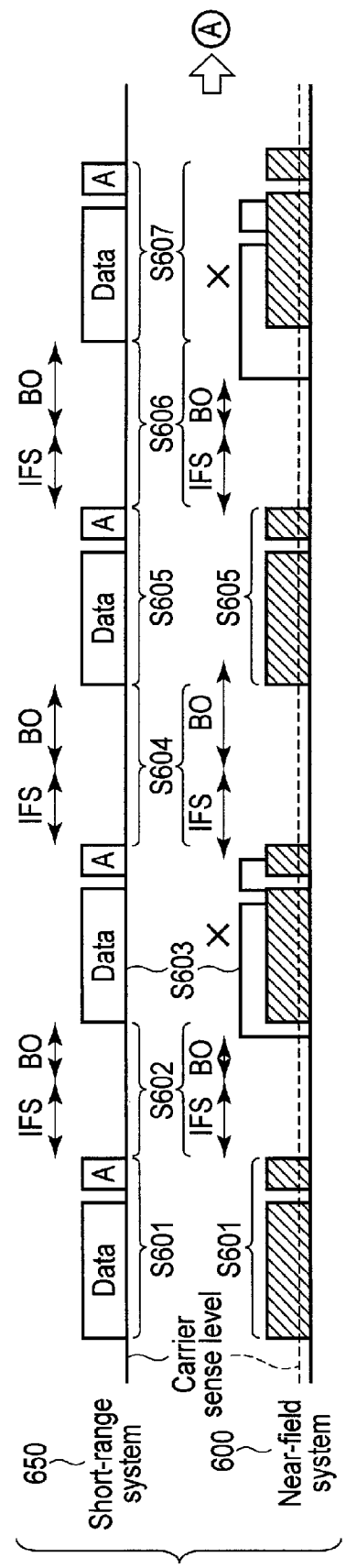
F I G. 6A

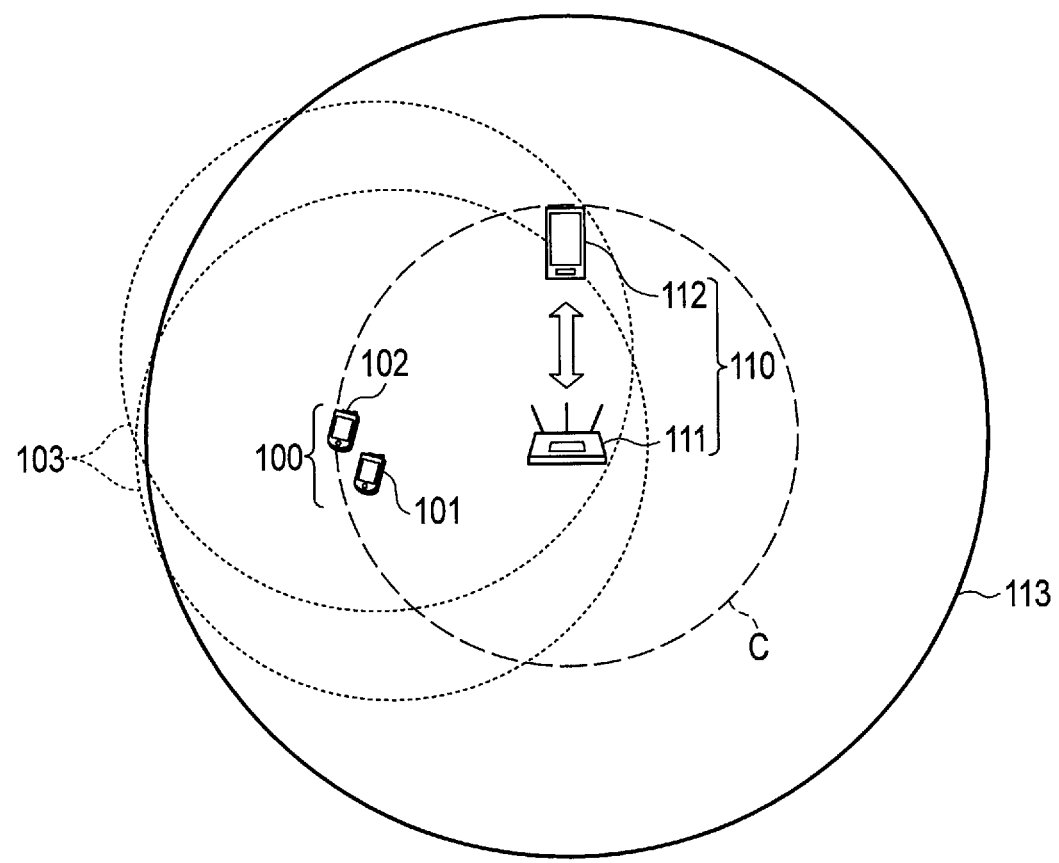
F I G. 7

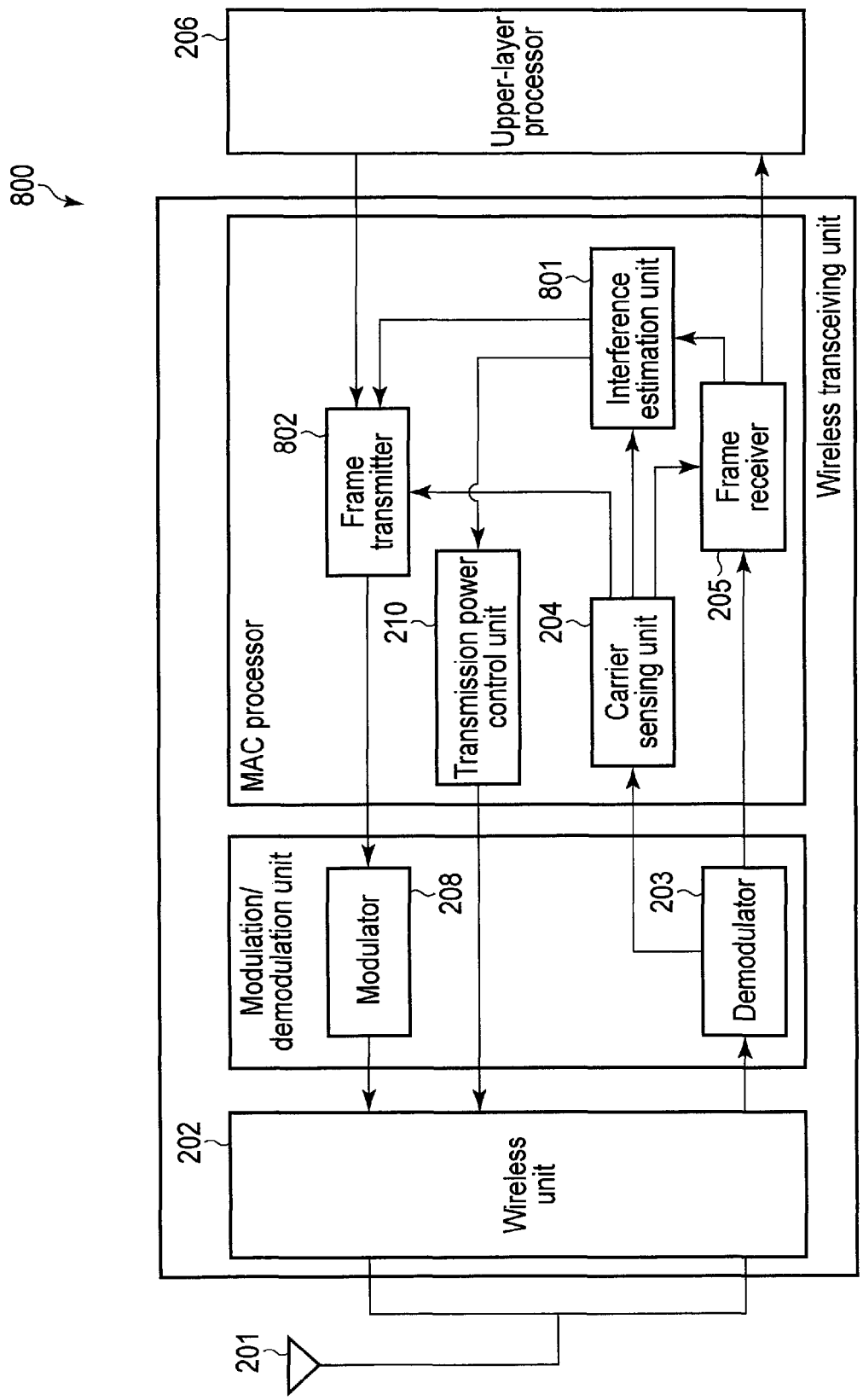
F I G. 8

|  | Case A (Area A) | Case B (Area B) | Case C (Area C) | Case D (Large distance between apparatuses) |
|---|---|---|---|---|
| 401 — Carrier busy ratio | Low | High | High | Low |
| 402 — Frame error ratio | Low | High | Low | High |
| 403 — Transmission power control | Normal | High | Normal | Normal |
| 901 — Inter frame space control | Short IFS | Short/Long switching control | Short/Long switching control | Short IFS |
F I G. 9
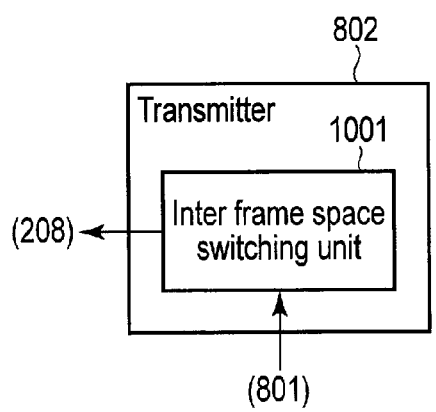
F I G. 10

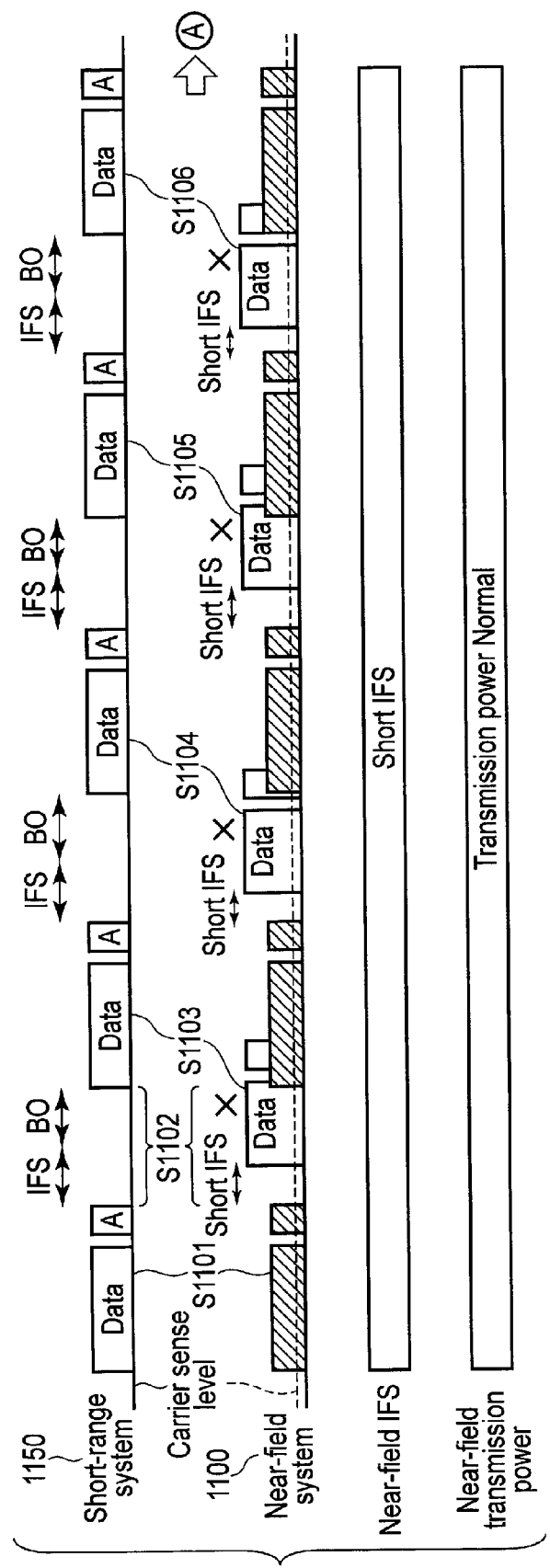
F I G. 11A

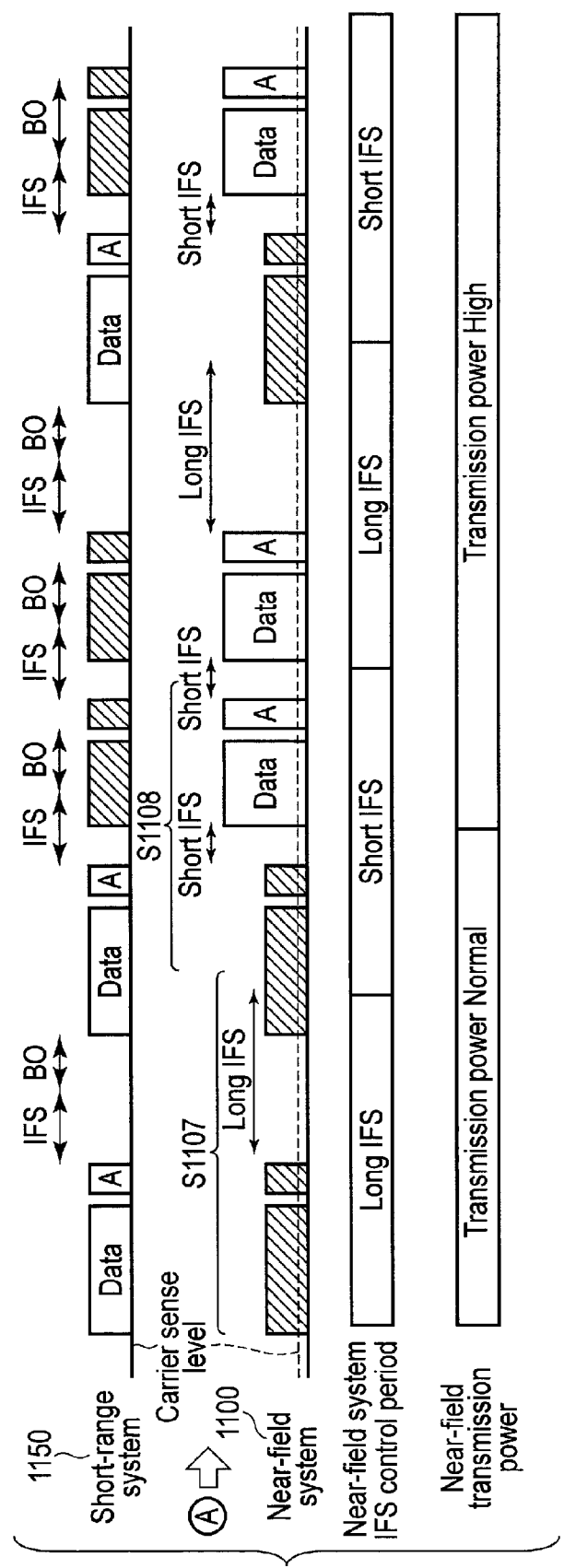
F I G. 11B

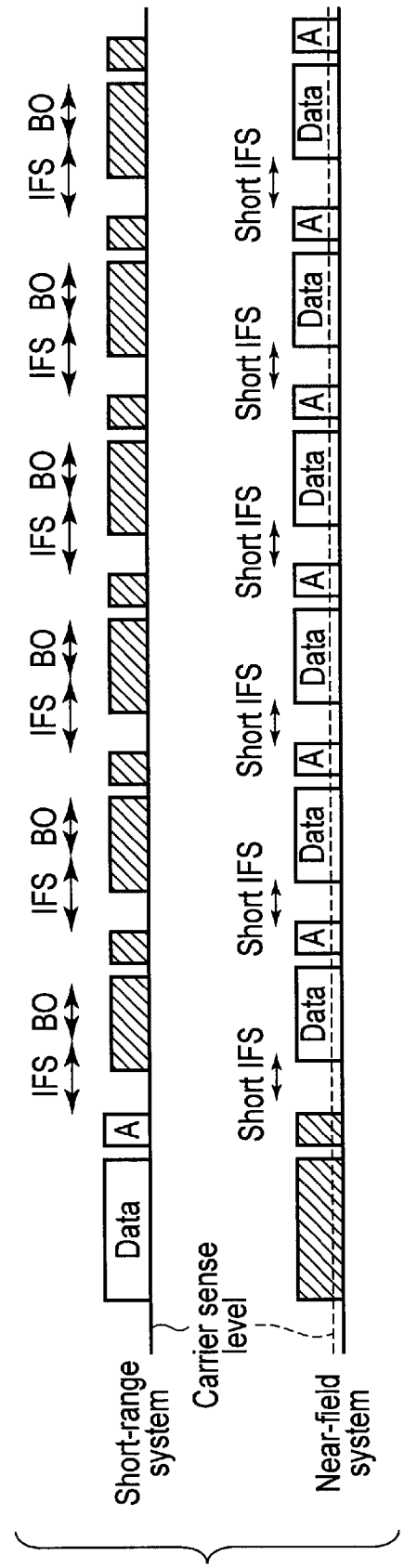
F I G. 12

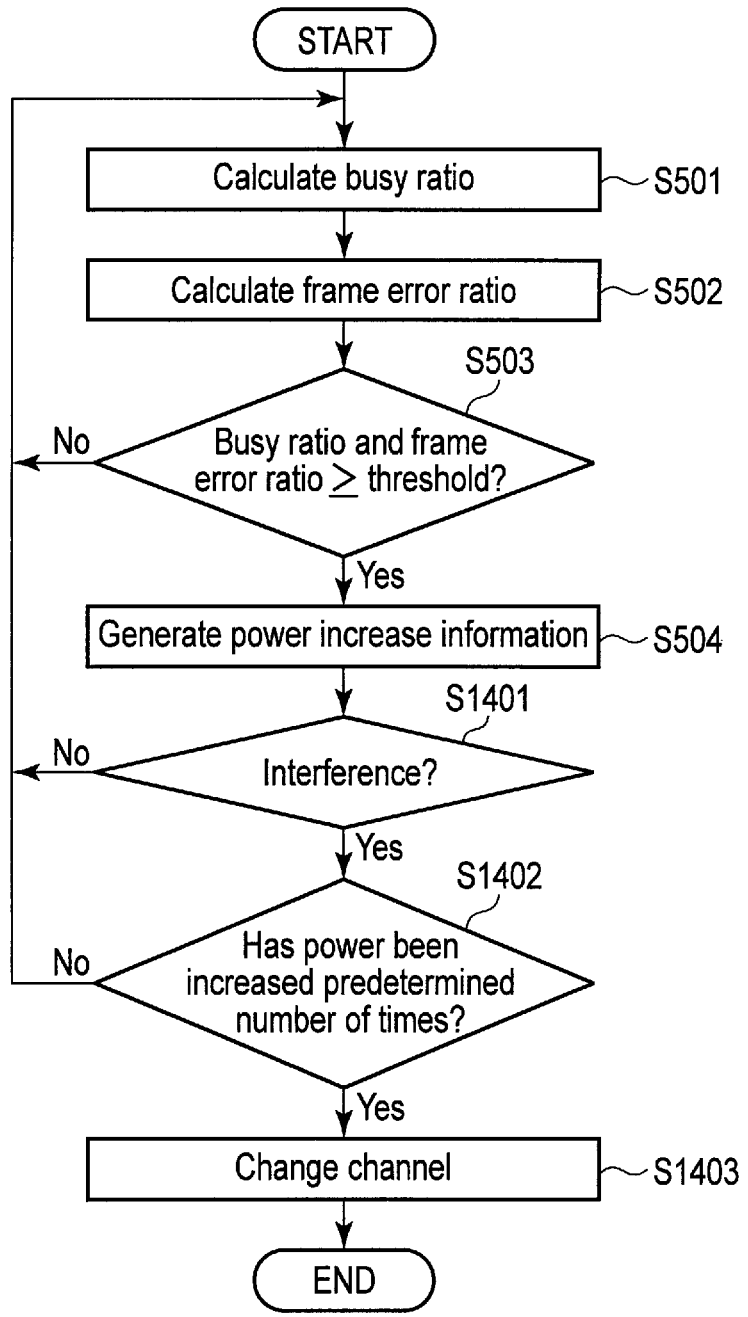
F I G. 14

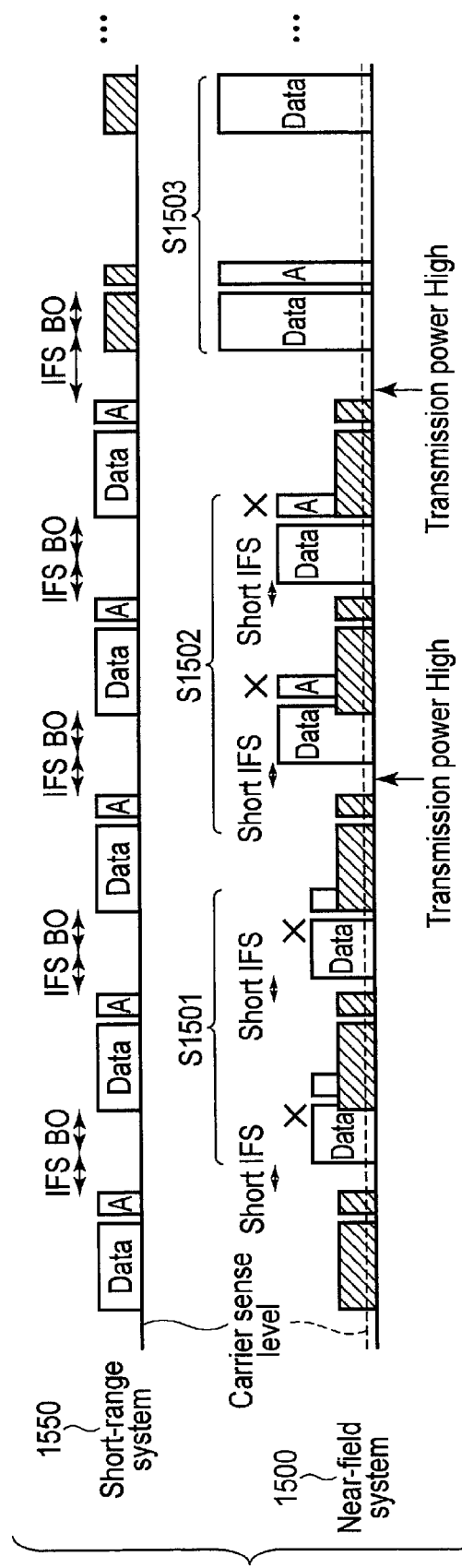
F I G. 15

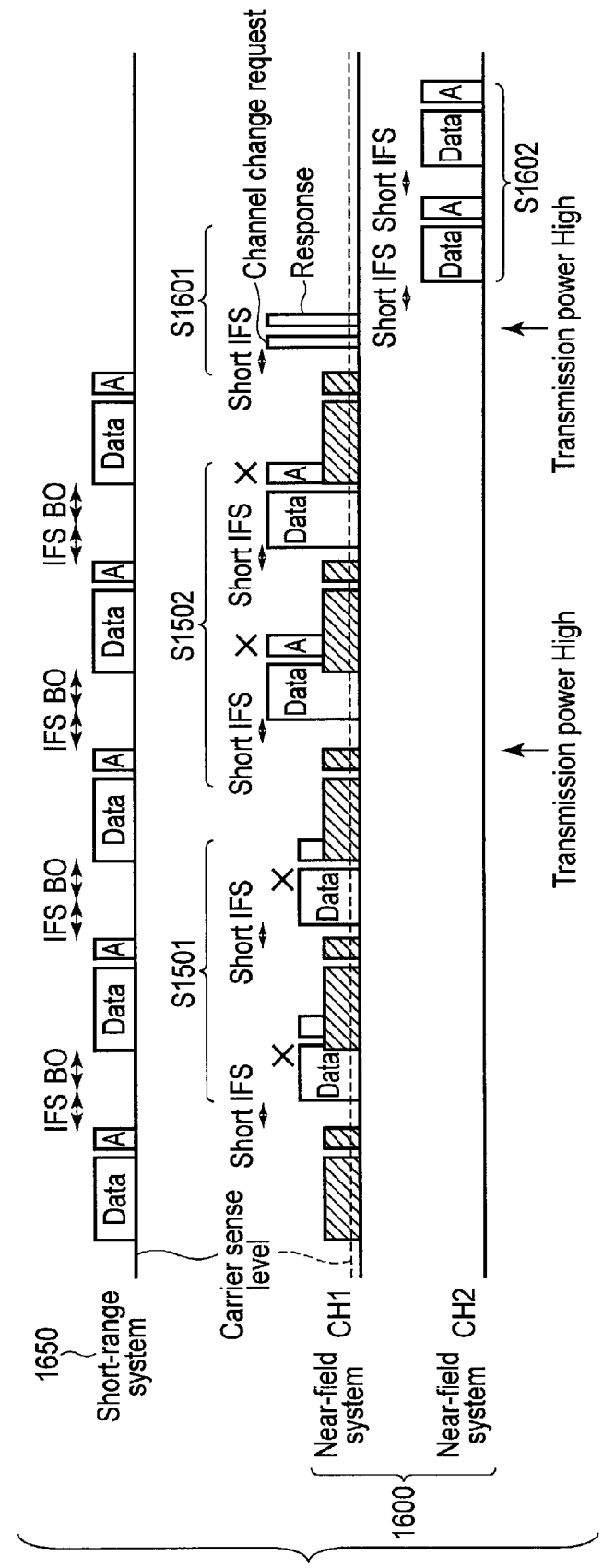
F I G. 16

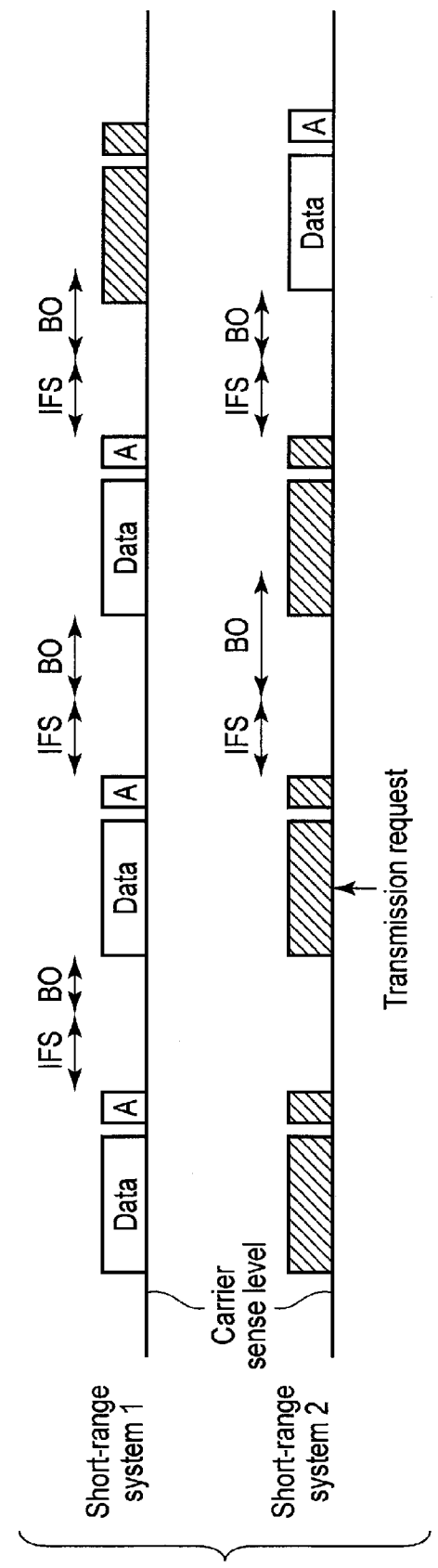
F I G. 17

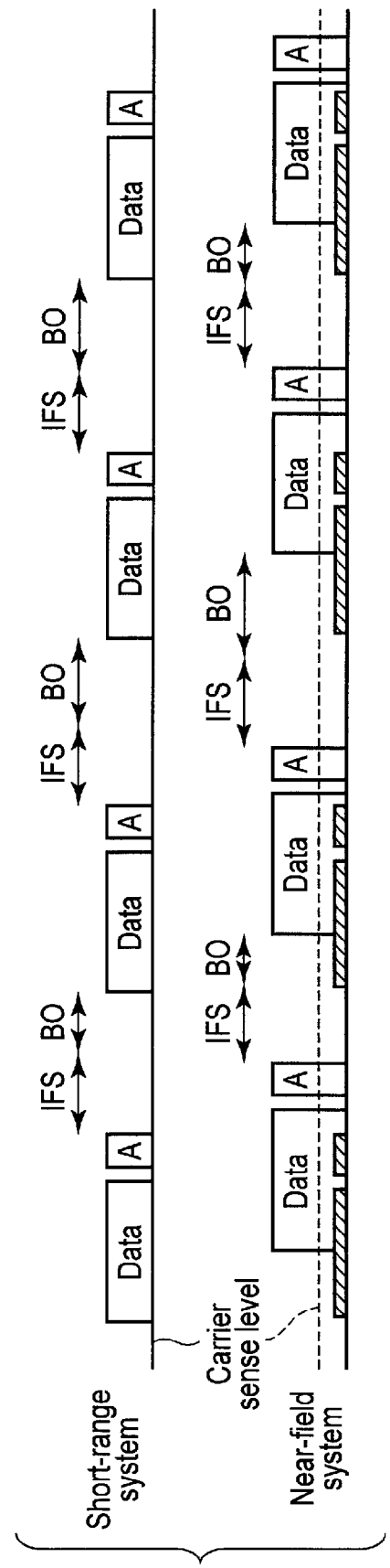
F I G. 18

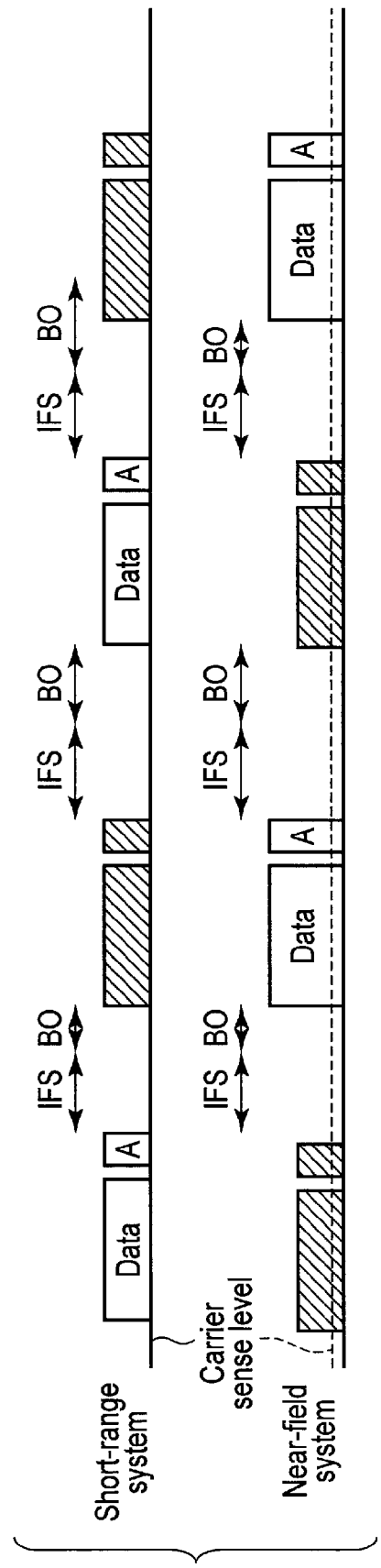
F I G. 19

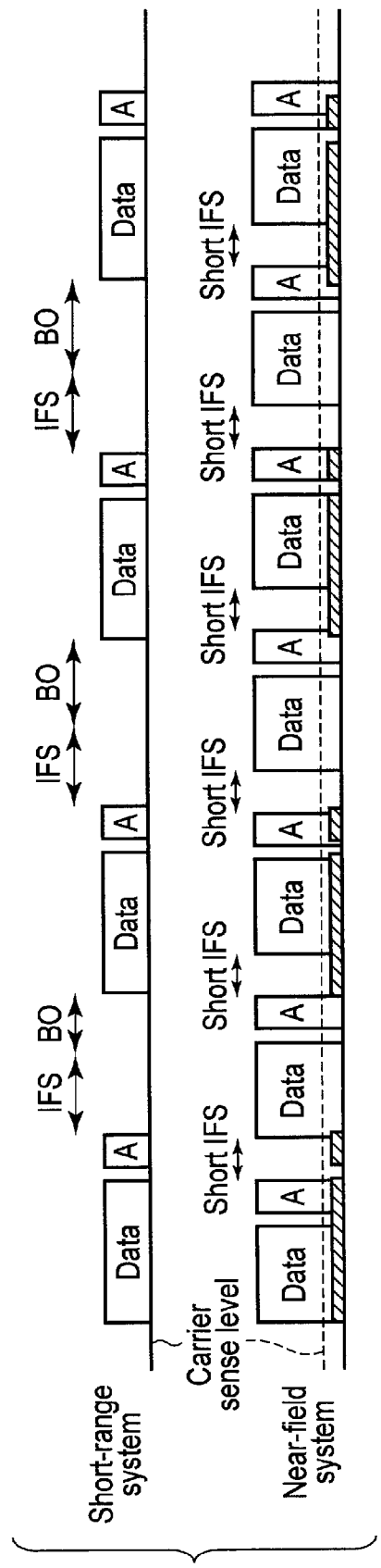
F I G. 20

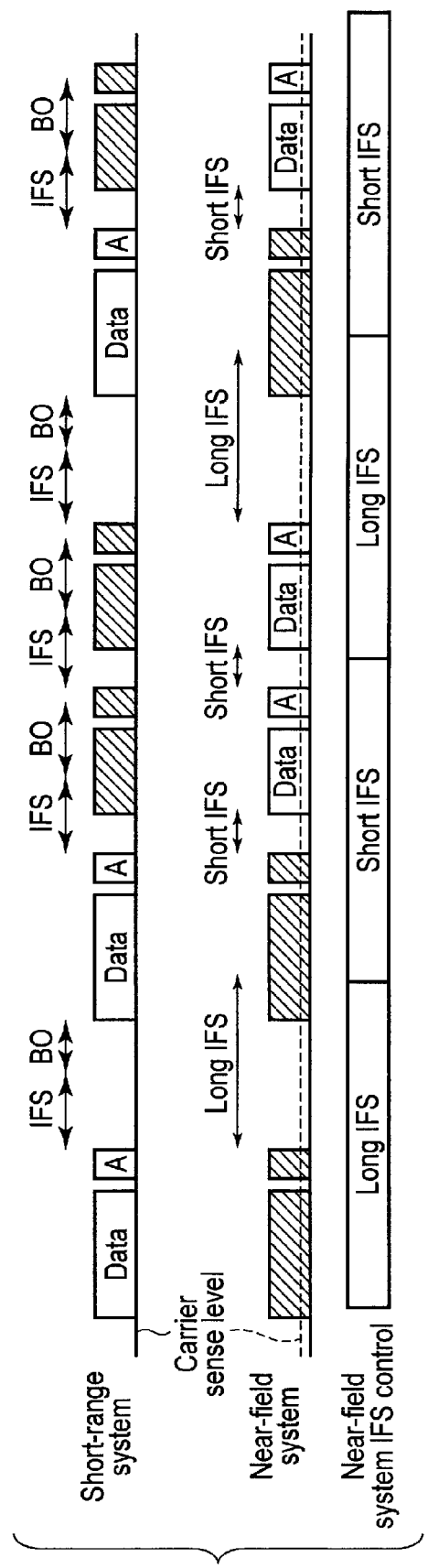
F I G. 21

WIRELESS COMMUNICATION APPARATUS AND METHOD

CROSS-REFERENCE TO RELATED APPLICATIONS

This application is based upon and claims the benefit of priority from Japanese Patent Application No. 2013-262688 filed Dec. 19, 2013, the entire contents of which are incorporated herein by reference.

FIELD

Embodiments described herein relate generally to a wireless communication apparatus and method.

BACKGROUND

In wireless transmission, in addition to a short-range system which is a wireless communication system of a short range and presupposes a transmission distance of several meters to several-ten meters, as represented by wireless local area network (LAN), there exists a near-field system which is a wireless communication system that provides services presupposing a very short communication range of several centimeter or less, as represented by near field communication (NFC). There have been an increasing number of opportunities in which these two systems coexist in the same area.

As a method of enabling the coexistence of the two systems, there is a method in which, for example, carrier sense levels of the short-range system and the near-field system are properly set, thereby enabling the coexistence. In addition, there is a method in which, when different systems interfere with each other, an inter frame space set of one of the systems is controlled, thereby enabling the coexistence. Besides, there is a method in which the near-field system estimates an interference of the short-range system and selects control, thereby enabling the coexistence in an identical frequency band in a specific case.

BRIEF DESCRIPTION OF THE DRAWINGS

FIG. 1 is a conceptual view showing a positional relationship between a short-range system and a near-field system.

FIG. 2 is a block diagram showing a wireless communication apparatus according to a first embodiment.

FIG. 5 is a flowchart showing a process of the interference estimation unit according to the first embodiment.

FIG. 6A is a sequence diagram showing data transmission/reception in the near-field system and the short-range system according to the first embodiment.

FIG. 7 is a view showing a variation of service areas of the short-range system and the near-field system after transmission power has been increased.

FIG. 8 is a block diagram showing a wireless communication apparatus according to a second embodiment.

FIG. 9 is a view showing an example of an interference estimation table according to the second embodiment.

FIG. 10 is a block diagram showing a transmitter according to the second embodiment.

FIG. 11A is a sequence diagram showing data transmission/reception in the near-field system and the short-range system according to the second embodiment.

FIG. 11B is a sequence diagram showing data transmission/reception in the near-field system and the short-range system according to the second embodiment.

FIG. 12 is a sequence diagram showing data transmission/reception of the near-field system and the short-range system in a case where only transmission power control is executed.

FIG. 14 is a flowchart showing the operation of a wireless communication apparatus according to a fourth embodiment.

FIG. 15 is a sequence diagram showing data transmission/reception in a case where transmission power is increased stepwise.

FIG. 16 is a sequence diagram showing data transmission/reception in a case where a frequency channel is changed.

FIG. 17 is a view showing a prior-art example of data transmission and reception in a case where short-range systems execute band sharing.

FIG. 18 is a sequence diagram showing data transmission/reception in a case where a near-field system exists in an area A in FIG. 1.

FIG. 19 is a sequence diagram showing data transmission/reception in a case where a near-field system exists in an area C in FIG. 1.

FIG. 20 is a sequence diagram showing data transmission/reception of the short-range system and near-field system in the area A in FIG. 1 in a case where an IFS of the near-field system is Short IFS.

FIG. 21 is a sequence diagram showing data transmission/reception of the short-range system and near-field system in the area C in FIG. 1 in a case where the IFS of the near-field system is Short IFS.

DETAILED DESCRIPTION

Figures 3, 4:
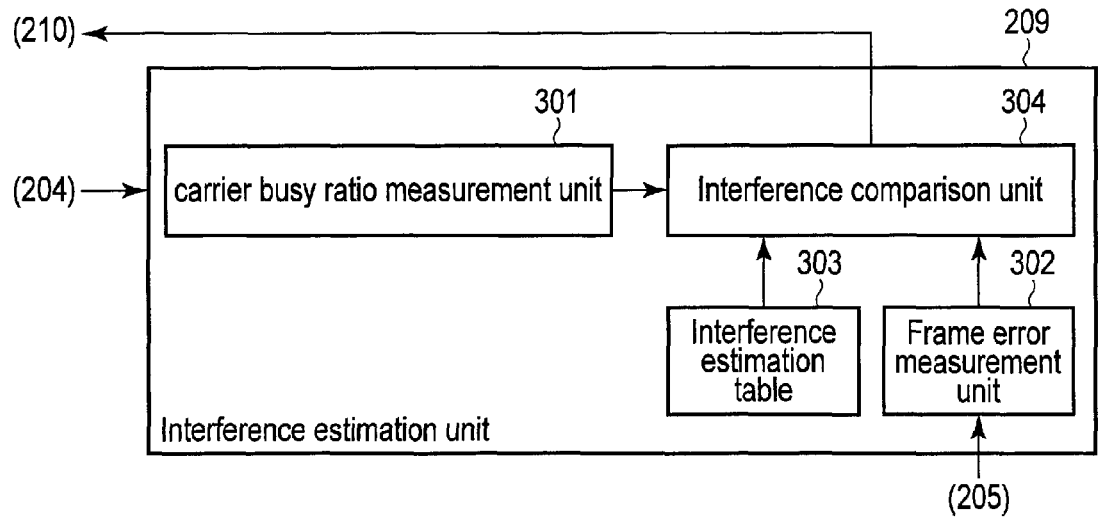
FIG. 3 is a block diagram showing an interference estimation unit.
FIG. 4 is a view showing an example of an interference estimation table.

In the communication in a near-field system, in some cases, because a transmission power in the near-field system is small, a reception power of a signal which is transmitted from the near-field system and is received at a short range system does not reach the carrier sense level of the short-range system, and the short-range system cannot recognize the presence of the near-field system. This is similar to a hidden node problem in a case where the recognition of a terminal is executed by carrier sense of, e.g. wireless LAN. However, a general solution to the hidden terminal problem is collision control in the same system in which a base station exists, and "notification of hidden terminal information" from the base station to the terminal is necessary. Thus, in the case where the short-range system and the near-field system are stipulated as different methods/protocols and mutual information transmission cannot be performed, the application of this solution is difficult.

In addition, as another method for the coexistence, there is known a cognitive system in which methods/systems of different communication ranges are made to coexist with the same frequency. However, during the period in which communication is executed by the short-range system that is a primary system, communication cannot be executed by the near-field system that is a secondary system, and a band cannot equally be shared.

In general, according to one embodiment, a wireless communication apparatus includes a transceiver, an estimator and a controller. The transceiver transmits and receives a frame in a frequency band which is used by a first system, the first system executing communication in a first communication range determined by a first transmission power and a first antenna gain. The estimator determines whether or not an amount of interference in the frequency band from a second system is no less than a threshold, the second system executing communication in a second communication range, the second communication range being larger than the first communication range and being determined by a second transmission power and a second antenna gain, the second transmission power being greater than the first transmission power. The controller increases a transmission power when the amount of interference is no less than the threshold.

Next, wireless communication apparatuses and methods according to embodiments of the present disclosure will be described in detail with reference to the accompanying drawings. Incidentally, in the embodiments below, it is assumed that parts with the same reference numerals perform the same operation, and an overlapping description is omitted.

(First Embodiment)

Referring to a conceptual view of FIG. 1, a description is given of a positional relationship between a short-range system and a near-field system according to the present embodiment.

In this case, wireless communication with a narrow communication range, such as NFC, is referred to as "near-field system" (also referred to as "first system"), and wireless communication with a wider communication range than NFC or the like, such as wireless LAN IEEE802.11 or the like, is referred to as "short-range system" (also referred to as "second system"). The wireless communication apparatus according to the present embodiment makes use of the near-field system. In addition, the communication range is determined by a (maximum) transmission power and an antenna gain. Specifically, the communication range (service area) of the short-range system is determined by a greater (maximum) transmission power than the (maximum) transmission power of the near-field system, and the antenna gain.

A near-field system 100 includes a near-field terminal 101 and a near-field terminal 102, which wirelessly communicate with each other. It should suffice if at least one of the near-field terminal 101 and near-field terminal 102 is the wireless communication apparatus according to the present embodiment.

A short-range system 110 includes a short-range base station 111 and a short-range terminal 112. The short-range base station 111 and short-range terminal 112 wirelessly communicate with each other within a service area 113 of the short-range base station 111.

As illustrated in FIG. 1, in accordance with the distance from the short-range base station 111, an area A, an area B and an area C are classified in the named order from a farthest position from the short-range base station 111.

In the area A, the short-range system 110 and near-field system 100 exist at remote positions. In particular, since the transmission and reception power of the near-field system 100 is smaller than that of the short-range system 110 by 10 dB or more, a reception power of a signal which is transmitted from the near-field system 100 and is received at the short range system 110 does not reach a carrier sense level of the short-range system 110. Accordingly, without interference from the near-field system 100, the short-range system 110 can continuously transmit data and receive data. On the other hand, since the near-field system 100 is within the service area of the short-range base station 111 of the short-range system 110, a signal from the short-range system 110 is received in the near-field system 100. However, by setting the carrier sense level in the near-field system 100 at a high level, data can be continuously transmitted and received even in the near-field system 100, without interference by a signal from the short-range system 110.

In the area C, since the distance between the near-field system 100 and the short-range system 110 is short, carrier sense is enabled in both systems. Thus, based on the carrier sense, a same frequency band can be shared.

On the other hand, in the area B, a signal from the short-range system 110 can be received in the near-field system 100, but a signal from the near-field system 100 cannot be received in the short-range system 110 and a carrier busy state cannot be detected. Thus, it is possible that the short-range system 110 starts transmission and reception, despite data transmission and reception being executed on the near-field system 100 side, and may interfere with the near-field system 100.

Hereafter, in the present embodiment, a process in a near-field terminal of the near-field system 100 in the positional relationship as in the area B is assumed.

Next, the wireless communication apparatus according to the first embodiment is described with reference to a block diagram of FIG. 2.

A wireless communication apparatus 200 according to the first embodiment includes an antenna 201, a wireless unit 202, a demodulator 203, a carrier sense unit 204, a frame receiver 205, an upper-layer processor 206, a frame transmitter 207, a modulator 208, an interference estimation unit 209, and a transmission power controller 210.

The antenna 201 is connected to the wireless unit 202, receives a wireless signal from the outside, and transmits a wireless signal to the outside. It should suffice if the configuration of the antenna is a general one, such as a dipole antenna, a patch antenna or a coupler antenna, so a detailed description thereof is omitted here.

The wireless unit 202 receives a wireless signal from the antenna 201, and converts the wireless signal from a wireless frequency band (RF band) signal to a baseband signal. In addition, the wireless unit 202 receives a baseband signal from the modulator 208, receives a transmission power value from the transmission power controller 210 (to be described below), converts the baseband signal to a wireless signal, and transmits the wireless signal to the outside with a transmission power corresponding to the transmission power value.

The demodulator 203 receives the baseband signal from the wireless unit 202, demodulates the baseband signal, and obtains a digital signal including a data frame.

The carrier sense unit 204 receives from the demodulator 203 a baseband signal intensity and a gain at a time of reception, calculates a reception signal intensity, and compares the reception signal intensity and a preset carrier sense level. When the reception signal intensity is no less than the carrier sense level, the carrier sense unit 204 determines "carrier busy" which is a condition in which other communication occupies a frequency band for use and the communication is congested, and generates carrier busy information. On the other hand, when the reception signal intensity is less than the carrier sense level, the carrier sense unit 204 determines "carrier empty" which is a condition in which there is no other communication in the frequency band for use, and generates carrier empty information. Each of the carrier busy information and the carrier empty information is also referred to as a carrier sense determination result.

The frame receiver 205 receives a digital signal from the demodulator 203.

The upper-layer processor 206 receives the digital signal from the frame receiver 206, and extracts data. In addition, the upper-layer processor 206 generates data which is to be transmitted to some other apparatus.

The frame transmitter 207 receives the data from the upper-level processor 206, and receives a carrier sense result (i.e. carrier busy information or carrier empty information) from the carrier sense unit 204. The frame transmitter 207 generates a digital signal including data, and stands by for data transmission when carrier busy information has been received. On the other hand, when carrier empty information has been received, the frame transmitter 207 sends the digital signal including a data frame to the modulator 208 if the "carrier empty" state continues for a preset period or more.

The modulator 208 receives the digital signal from the frame transmitter 207, modulates the digital signal, and generates a baseband signal.

The interference estimation unit 209 receives the determination result from the carrier sense unit 204, and receives the digital signal from the frame receiver 205. The interference estimation unit 209 determines whether or not the interference amount from the short-range system in the frequency band for use is no less than a threshold. When the interference amount is no less than the threshold, the interference estimation unit 209 generates power increase information which indicates that transmission power is to be increased. The power increase information may be, for instance, a power value at a time of transmission, or a decibel value corresponding to the increase of power.

The transmission power controller 210 receives the power increase information from the interference estimation unit 209, sets the transmission power value in accordance with the power increase information, and controls the transmission power in the wireless unit 202.

Next, the details of the interference estimation unit 209 will be described with reference to a block diagram of FIG. 3.

The interference estimation unit 209 includes a carrier busy ratio measurement unit 301, a frame error measurement unit 302, an interference estimation table 303, and an interference comparison unit 304.

The carrier busy ratio measurement unit 301 receives a carrier sense determination result from the carrier sense unit 204 at a time of a transmission start or at a time of a connection process, and measures a carrier busy ratio indicative of a ratio of a congestion condition of communication, based on a result of observation of "carrier busy" by performing the carrier sense during a preset period.

The frame error measurement unit 302 receives the digital signal from the frame receiver 205, and measures a frame error ratio indicative of a ratio at which frames could not be correctly received at a time of receiving frames.

In the interference estimation table 303, values of the carrier busy ratio and values of the frame error ratio are associated and stored.

The interference comparison unit 304 receives a carrier busy ratio from the carrier busy ratio measurement unit 301, and receives a frame error ratio from the frame error measurement unit 302. The interference comparison unit 304 compares the interference estimation table 303, with the carrier busy ratio and frame error ratio, and determines whether or not the associated values are no less than thresholds. If the associated values are no less than the thresholds, the interference comparison unit 304 determines that the interference amount is no less than a threshold, and generates power increase information.

Next, referring to FIG. 4, an example of the interference estimation table 303 is described.

In the interference estimation table 303, a set of a carrier busy ratio 401 and a frame error ratio 402, and a transmission power 403 are associated with respect to each of cases.

As illustrated in FIG. 4, in a case A, when the carrier busy ratio 401 is low and the frame error ratio 402 is also low, this indicates that the each of systems are communicable, and it can be determined that the case A is such a case that the near-field system exists in the area A in FIG. 1. In this case, since there is no need to change the transmission power, the transmission power 403 is set to be normal (Normal).

In a case B, when the carrier busy ratio 401 is high and the frame error ratio 402 is also high, it can be thought that there is much interference from the other system, and the other system is unable to recognize the presence of the own system. Thus, it can be determined that the case B is such a case that the near-field system exists in the area B in FIG. 1. In this case, since there is a need to change the transmission power, the transmission power 403 is set to be high (High).

In a case C, when the carrier busy ratio 401 is high and the frame error ratio 402 is low, this indicates that, although a signal from the other system is being received in the own system, communication is possible without interference. Thus, it can be determined that the case C is such a case that the near-field system exists in the area C in FIG. 1. In this case, since there is no need to change the transmission power, the transmission power 403 is set to be normal (Normal).

In addition, when the carrier busy ratio 401 is low and the frame error ratio 402 is high, such a case is assumed that the distance between the wireless communication apparatuses is large. In this case, the transmission power is set to be normal (Normal).

The determination as to whether the carrier busy ratio 401 and frame error ratio 402 are high or low, as illustrated in FIG. 4, may be made by using thresholds. For example, if the carrier busy ratio 401 is no less than a threshold, "High" may be determined, and if the carrier busy ratio 401 is less than the threshold, "Low" may be determined. Similarly, if the frame error ratio 402 is no less than a threshold, "High" may be determined, and if the frame error ratio 402 is less than the threshold, "Low" may be determined. In addition, aside from the expressions "High" and "Low", percentages indicative of thresholds may be stored.

Next, the process of the interference estimation unit 209 is described with reference to a flowchart of FIG. 5.

In step S501, the carrier busy ratio measurement unit 301 calculates the carrier busy ratio.

In step S502, the frame error measurement unit 302 calculates the frame error ratio.

In step S503, the interference comparison unit 304 determines whether or not both the carrier busy ratio and the frame error ratio are no less than thresholds. If both the carrier busy ratio and the frame error ratio are no less than the thresholds, the interference comparison unit 304 determines that the interference amount is a threshold or more, and goes to step S504. If both the carrier busy ratio and the frame error ratio are less than the thresholds, the interference comparison unit 304 goes back to step S501 and repeats the same process.

In step S504, the interference comparison unit 304 generates power increase information.

Figure 6B:
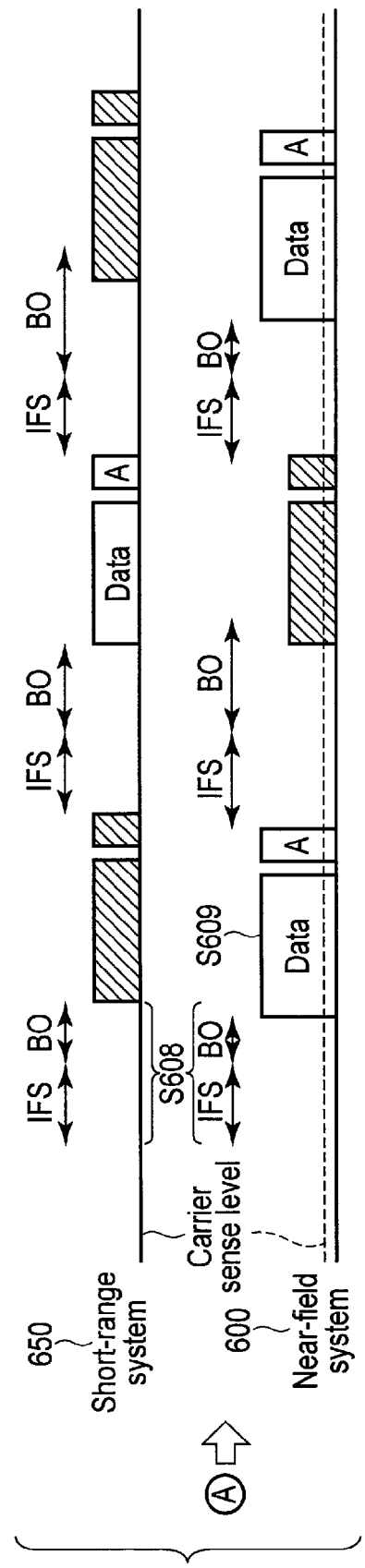
FIG. 6B is a sequence diagram showing data transmission/reception in the near-field system and the short-range system according to the first embodiment.

Next, referring to FIG. 6A and FIG. 6B, a description is given of sequences of data transmission and data reception in a near-field system including the wireless communication apparatus 200 according to the first embodiment, and a short-range system.

The case is now assumed in which a near-field system 600 including the wireless communication apparatus 200 according to the first embodiment and a short-range system 650, which is another communication system, are present at positions in the area B illustrated in FIG. 1. Each of an upper part of FIGS. 6A and 6B is a sequence of data transmission and data reception in the short-range system, and each of a lower part of FIGS. 6A and 6B is a sequence of transmission and reception of data in the near-field system. A communication condition between two wireless communication apparatuses 200 is indicated by a timing chart on one line. For example, "Data" is indicative of data transmission from the wireless communication apparatus 200 to the other wireless communication apparatus, and "A(Ack)" is indicative of data transmission from the other wireless communication apparatus to the wireless communication apparatus 200.

In step S601, there are transmission requests in both the short-range system 650 and the near-field system 600, and, to start with, the short-range system 650 executes data transmission and data reception (hereinafter, including transmission and reception of ACK). In the near-field system 600, carrier sense is being executed and "carrier busy" is observed since the short-range system 650 is transmitting and receiving data, and thus the near-field system 600 does not execute transmission and reception.

In step S602, if the data transmission and data reception of the short-range system 650 ends, both the wireless communication apparatuses 200 in the short-range system 650 and the near-field system 600 execute carrier sense in an Inter Frame Space (IFS)+Back Off (BO) period, and observe whether the carrier sense indicates "carrier empty" or not. The IFS is a frame interval which is a reference, and the BO is a random time which is probabilistically determined.

In step S603, assuming that the BO period of the near-field system 600 is short, the near-field system 600 acquires a transmission right and starts data transmission and data reception. In this case, the data transmission and data reception of the near-field system 600 cannot be detected on the short-range system 650 side, and "carrier busy" cannot be detected. Thus, despite the transmission and reception being executed in the near-field system 600, the short-range system 650 determines "carrier empty" in the IFS+BO period and recognizes that the transmission right has been acquired, and data transmission and data reception is started. In this case, in the area B shown in FIG. 1, since the transmission and reception of the short-range system 650 appears as strong interference in the near-field system 600, the near-field system 600, which has started transmission and reception, becomes unable to execute transmission and reception due to the interference from the short-range system 650.

In step S604, both the short-range system 650 and the near-field system 600 execute carrier sense once again in the IFS+BO period, and observes whether "carrier empty" is determined or not.

In step S605, assuming that the BO period of the short-range system 650 is short, the short-range system 650 acquires a transmission right and starts data transmission and data reception. On the other hand, since "carrier busy" is observed in the near-field system 600 in accordance with the transmission and reception of the short-range system 650, the near-field system 600 suspends transmission and reception and stands by until "carrier empty" will occur.

In step S606, if the data transmission and data reception of the short-range system 650 ends, both the short-range system 650 and the near-field system 600 execute carrier sense in the IFS+BO period, and observe whether "carrier empty" is determined or not.

In step S607, the BO period of the near-field system 600 is short, and the near-field system 600 acquires a transmission right and starts data transmission and data reception. However, like step S603, the transmission and reception of the near-field system 600 cannot be observed in the short-range system 650, and the short-range system 650 starts data transmission and reception. As a result, the near-field system 600 is affected by interference, and transmission and reception in the near-field system 600 fails.

In this case, the interference estimation unit 209 of the wireless communication apparatus 200 estimates how interference is occurring, from the condition from step S601 to step S606. Specifically, the carrier busy ratio measurement unit 301 measures at what degree of the ratio the "carrier busy" due to the influence of the other system is detected during the IFS+BO period. In FIGS. 6A and 6B, "carrier busy" (step S601 and step S605) is detected two times in four-time trials, and the carrier busy ratio is 50%.

In the frame error measurement unit 302, calculates the frame error ratio by measuring cases in which the wireless communication apparatus 200 started transmission and reception but the transmission and reception of the frame thereof failed. In FIGS. 6A and 6B, the frame transmission and reception failed two times in the two-time trials (second period and fourth period), and the frame error ratio is 100%. In this case, if it is assumed that the interference estimation table illustrated in FIG. 4 is referred to and the carrier busy ratio is set to be "High" at a threshold of 50% or more and the frame error ratio is set to be "High" at a threshold of 80% or more, the carrier busy ratio is determined to be "High" and the frame error ratio is also determined to be "High". Accordingly, the interference estimation unit 209 generates a signal increase signal which sets transmission power control at "High". The transmission power controller 210 increases the transmission power. For example, the transmission power is increased by +5 dB.

In step S608, both the short-range system 650 and the near-field system 600 execute carrier sense once again in the IFS+BO period, and observes whether "carrier empty" is determined or not.

In step S609, the near-field system 600 acquires a transmission right, and transmits and receives data with the transmission power increased by 5 dB. In this manner, by having increased the transmission power at the time of data transmission in the near-field system 600, the data transmission and data reception in the near-field system 600 can also be recognized by carrier sense in the short-range system 650. Therefore, the frequency band can be shared based on the observation of "carrier empty" in the IFS+BO period, and the opportunities of transmission can be made equal between the two systems.

Next, FIG. 7 illustrates a variation of service areas of the short-range system and the near-field system after transmission power has been increased. FIG. 7 is a view which schematically illustrates the service areas in the respective systems in the same positional relationship as in FIG. 1.

As illustrated in FIG. 7, by increasing (e.g. 5 dB) the transmission power of the near-field system 100, the short-range system 110 can recognize the transmission and reception of the near-field system 100 by carrier sense. In other words, it is understood that the previous relationship of the area B in which "the near-field system can recognize the short-range system but the short-range system cannot recognize the near-field system" has been changed to the relationship of the area C in which "both systems can recognize each other".

According to the first embodiment described above, the carrier busy ratio and the frame error ratio are measured, and it is determined whether the amount of interference is no less than the threshold. Thereby, the case, in which the own system can recognize the other system but the own system is not recognized in the other system, is recognized. In this case, the frame transmission power is controlled and increased. Thus, both systems can recognize each other, and transmission opportunities are made equal while the same frequency band is shared.

(Second Embodiment)

A second embodiment differs from the first embodiment in that the inter frame space for observing "carrier empty" is controlled, in addition to the control of transmission power. In the near-field system, in many cases, there is no need to share a band among a plurality of wireless communication apparatuses. Thus, there is a case of adopting such a protocol that a BO period for probabilistically controlling the acquisition of a transmission right is not provided, and when a certain terminal once acquired a transmission right, carrier sense is executed only in a shortest standby time called "Short IFS", and transmission and reception are continuously executed. Thereby, in the near-field system, a substantial data transmission/reception time, which is longer, can be secured. However, in the case where the other short-range system can observe a transmission signal and a reception signal of the near-field system, since data is transmitted by Short IFS, it is thus possible that a transmission opportunity cannot be obtained in the other short-range system. Accordingly, in the second embodiment, the transmission opportunities are made equal by controlling the inter frame space, and the transmission opportunities between different systems can be controlled in accordance with priority.

A wireless communication apparatus according to the second embodiment will now be described with reference to a block diagram of FIG. 8.

A wireless communication apparatus 800 according to the second embodiment includes an antenna 201, a wireless unit 202, a demodulator 203, a carrier sense unit 204, a frame receiver 205, an upper-layer processor 206, a modulator 208, a transmission power controller 210, an interference estimation unit 801, and a frame transmitter 802.

Since the antenna 201, wireless unit 202, demodulator 203, carrier sense unit 204, frame receiver 205, upper-layer processor 206, modulator 208 and transmission power controller 210 perform the same operations as in the above-described first embodiment, a description thereof is omitted here.

Although the interference estimation unit 801 performs the same operation as the interference estimation unit 209 according to the first embodiment, the interference estimation unit 801 differs from the interference estimation unit 209 in that the interference estimation unit 801 generates, in addition to the power increase information, inter frame space control information which is information relating to inter frame space control.

The frame transmitter 802 receives inter frame space control information from the interference estimation unit 801, and executes control to transmit frames at inter frame spaces indicated by the inter frame space control information.

Next, referring to FIG. 9, a description is given of an interference estimation table according to the second embodiment, which is referred to by the interference estimation unit 801.

An interference estimation table 900 according to the second embodiment includes a carrier busy ratio 401, a frame error ratio 402, a transmission power 403 and an inter frame space control 901. The carrier busy ratio 401, frame error ratio 402 and transmission power 403 are the same as in the first embodiment.

The inter frame space control 901 indicates, as an IFS to be set, a normal IFS value (Normal), or a control value for switching between Short IFS and Long IFS. The Short IFS is a time interval which is shorter than the IFS of the short-range system, and the Long IFS is a time interval which is longer than the IFS of the short-range system. Since the BO of the short-range system is probabilistic, it is not realistic to make the Long IFS longer than all IFS+BO periods, but it is desirable to make the Long IFS longer than at least an average time of IFS+BO.

Specifically, for example, in a case B in which the carrier busy ratio 401 is "High" and the frame error ratio 402 is "High", the transmission power "High" and the switching control between Short IFS and Long IFS are associated.

Next, the details of the frame transmitter 802 are described with reference to a block diagram of FIG. 10.

The frame transmitter 802 includes an inter frame space switching unit 1001.

The inter frame space switching unit 1001 receives inter frame space control information from the interference estimation unit 801, and controls the IFS. In the case of controlling switching, the inter frame space switching unit 1001 executes control to effect switching between Short IFS and Long IFS. Incidentally, aside from the switching between the two IFS's, namely Short IFS and Long IFS, it may be possible to execute control to effect switching between an inter frame space set including Short IFS and an inter frame space set including Long IFS. As regards the timing of the switching between the two IFS's of Short IFS and Long IFS or between the inter frame space sets including the two IFS's, control may be executed to effect switching in accordance with a predetermined algorithm, or control may be executed to effect switching in accordance with a predetermined pattern such as alternate switching.

Next, referring to FIG. 11A and FIG. 11B, a description is given of sequence examples of transmission/reception in the near-field system including the wireless communication apparatus 800 according to the second embodiment, and the short-range system.

Like the sequence charts of FIG. 6A and FIG. 6B, an upper part of each of FIGS. 11A and 11B is a sequence of data transmission and data reception in a short-range system 1150, and a lower part of each of FIGS. 11A and 11B is a sequence of data transmission and data reception in a near-field system 1100.

In step S1101, the short-range system 1150 acquires a transmission right in a preceding period and transmits and receives data. When the near-field system 1100 has executed carrier sense, since the near-field system 1100 can observe a transmission signal and a reception signal of the short-range system 1150, "carrier busy" is determined in the wireless communication apparatus.

In step S1102, the short-range system 1150 executes carrier sense in an IFS+BO period, and the near-field system 1100 executes carrier sense in a Short IFS period, thereby determining whether the communication condition is "carrier busy" or not.

In step S1103, since "carrier empty" has continued in the Short IFS period, the near-field system 1100 recognizes that a transmission right has been acquired, and starts data transmission and data reception data. On the other hand, since a transmission signal and a reception signal in the near-field system 1100 does not reach a carrier sense signal in the short-range system 1150, the short-range system 1150 determines that "carrier empty" continues, and starts data transmission and data reception after the IFS+BO period. Thus, in the near-field system 1100, the data transmission and data reception fail due to interference by a transmission signal and a reception signal from the short-range system 1150.

In step S1104 to step S1106, like step S1103, after the end of data transmission and reception in the short-range system 1150, data transmission and reception are started in the near-field system 1100 after the Short IFS period. However, in the near-field system 1100, the data transmission and reception fail due to interference from the short-range system 1150.

In step S1107, the interference estimation unit 801 of the wireless communication apparatus 800 of the near-field system 1100 calculates the carrier busy ratio and the frame error ratio. The interference estimation unit 801 determines that both the carrier busy ratio and the frame error ratio are no less than thresholds, and generates power increase information for increasing transmission power, and inter frame space control information. In accordance with the power increase information, the transmission power controller 210 of the wireless communication apparatus 800 executes control to increase the transmission power by 5 dB in this case. In addition, based on the inter frame space control information, the frame transmitter 802 of the wireless communication apparatus 800 executes control to effect switching between Short IFS and Long IFS. In this case, the IFS period is set to be the Long IFS. Accordingly, the IFS+BO period in the short-range system 1150 is shorter than the IFS+BO period in the near-field system 1100, and the short-range system 1150 acquires a transmission right and transmits and receives data. Since the near-field system 1100 is able to recognize "carrier busy", the near-field system 1100 stands by for data transmission and data reception.

In step S1108, the frame transmitter 802 of the wireless communication apparatus in the near-field system 1100 switches the IFS period to the Short IFS. Since the Short IFS period is shorter than the IFS+BO period of the short-range system 1150, the near-field system 1100 can acquire a transmission right and can execute data transmission and data reception. Further, since the transmission power has been increased, a transmission/reception signal of the near-field system 1100 is observed in the short-range system 1150 and "carrier busy" is detected, and the short-range system 1150 can stand by for data transmission. On the other hand, in the near-field system 1100, the data transmission and data reception are not affected by interference from the short-range system 1150. Hereafter, similarly, by switching the Short IFS period and Long IFS period, the same frequency band can be shared based on a fixed rule, while transmission opportunities are made equal.

Incidentally, in the example of FIGS. 11A and 11B, the ratio of allocation of switching between Short IFS and Long IFS is set to be 1:1, but transmission opportunities between the short-range system 1150 and near-field system 1100 may be controlled by adaptive control based on priority.

In addition, depending on a data size of transmission, only the transmission power control may be executed.

FIG. 12 is a sequence chart illustrating data transmission/reception of the near-field system and the short-range system in a case where the near-field system executes only transmission power control.

As illustrated in FIG. 12, since the IFS of the near-field system is the Short IFS, the near-field system can preferentially acquire transmission opportunities and can transmit data and receive data. Thus, in a so-called touch-and-get application in which data can instantaneously be transferred, even if priority is placed on the transmission and reception of the near-field system, the frequency band is occupied only in a relatively short period. Thus, thereafter, by handing the transmission right over to the short-range system side, the coexistence of the systems is enabled.

According to the above second embodiment described above, based on the carrier busy ratio and frame error ratio, the transmission power is increased, and furthermore control is executed to switch the inter frame space. Thereby, the priority of communication of the short-range system and near-field system can be controlled, and the system, which can preferentially communicate, can be selected.

(Third Embodiment)

In the wireless communication apparatus of the near-field system, it is not possible to determine a communication counterpart before a communication link is established. Thus, if the transmission power is increased before the communication link is established, it is possible that the interference with the short-range system is merely increased and the efficiency of the system deteriorates. This being the case, in a third embodiment, the transmission power is increased after a communication link is established in the near-field system. Thereby, useless interference with the other system can be suppressed, an unnecessary power increased can be suppressed, and power consumption is reduced.

Figure 13:
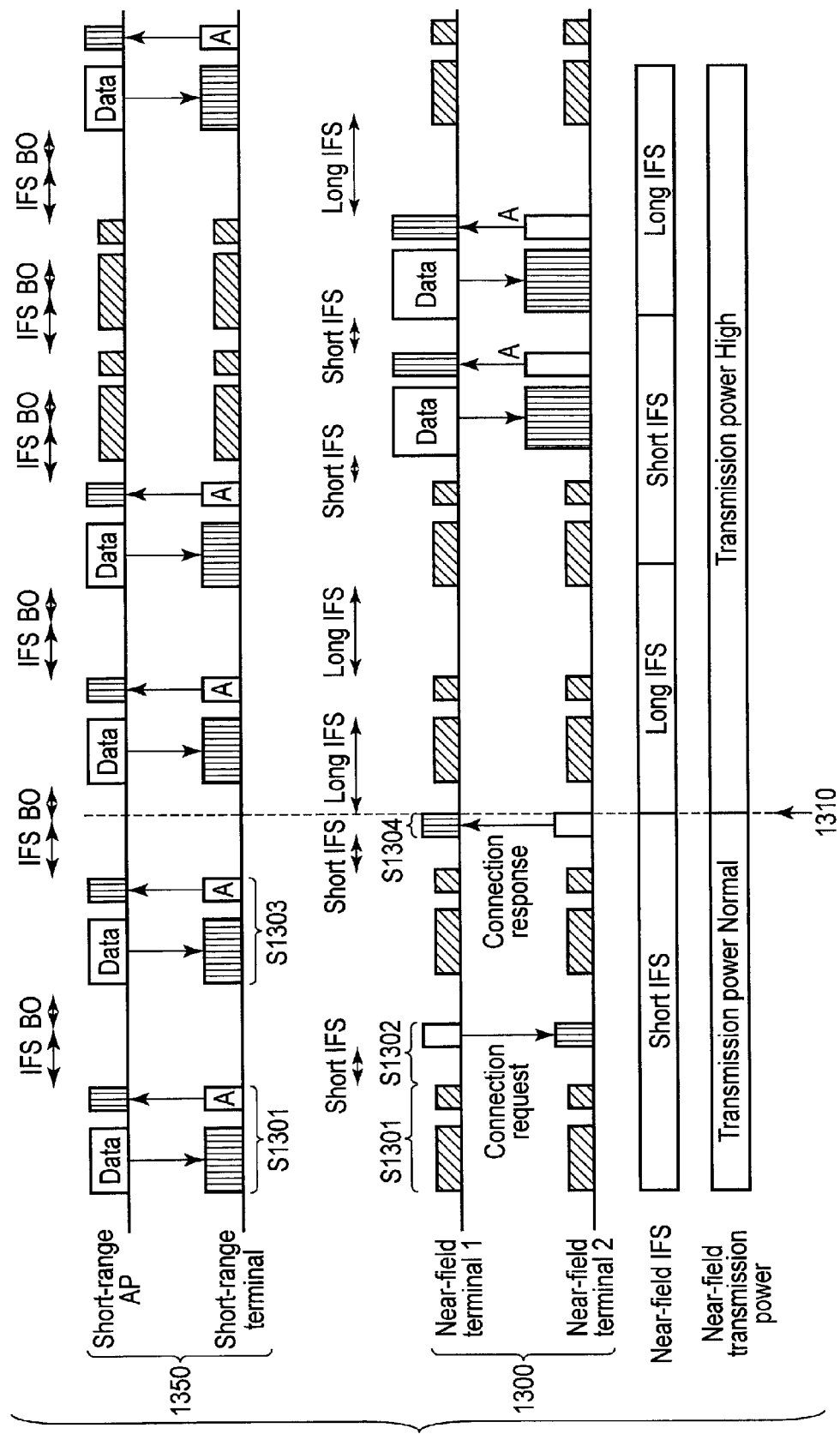
FIG. 13 is a sequence diagram showing data transmission/reception in the near-field system and the short-range system according to a third embodiment.

Referring to FIG. 13, a description is given of sequence examples of data transmission and data reception in the near-field system including the wireless communication apparatus according to the third embodiment, and the short-range system. Incidentally, it is assumed that, until a communication link is established, the transmission power of the near-field system is normal (Normal) and the inter frame space is Short IFS.

FIG. 13 illustrates data transmission and data reception between an access point and a short-range terminal in a short-range system 1350, and transmission and reception between a near-field terminal 1 and a near-field terminal 2 in a near-field system 1300.

Incidentally, in FIG. 13, the transmission and reception between the access point and the short-range terminal are illustrated in a divided fashion, and the transmission and reception between the wireless communication apparatuses (near-field terminal 1 and near-field terminal 2) are also illustrated in a divided fashion.

In step S1301, the access point of the short-range system 1350 transmits data, and the short-range terminal returns ACK. On the other hand, in the near-field system 1300, "carrier busy" is observed.

In step S1302, in order to start communication, the near-field terminal 1 in the near-field system 1300 determines "carrier empty" after executing carrier sense in a Short IFS period, and transmits a connection request to the near-field terminal 2. Incidentally, the Short IFS of the near-field system 1300 is shorter than the IFS+BO period of the short-range system 1350, and the connection request is shorter in data length than an ordinary packet. Thus, the near-field terminal 1 can complete the transmission of the connection request to the near-field terminal 2 during the IFS+BO period of the short-range system 1350.

In step S1303, since the short-range system 1350 cannot observe the transmission and reception of the near-field system 1300, the short-range system 1350 observes "carrier empty" by carrier sense during the IFS+BO period, and data is transmitted from the access point to the short-range terminal. On the other hand, in the near-field system 1300, "carrier busy" is observed. In step S1304, in order to return a connection response, the near-field terminal 2 of the near-field system 1300 executes carrier sense of Short IFS, and then transmits the connection response to the near-field terminal 1. In this case, at a time when the connection response has been completed, a communication link in the near-field system 1300 is established (link establishment time point 1310), and data transmission and data reception are started. Since the subsequent sequence is the same as in FIG. 10B, a description thereof is omitted here. From the link establishment time point 1310, switching control between Short IFS and Long IFS is executed and the transmission power is increased (from Normal to High).

At a time of starting data transmission and reception, the interference estimation unit 801 may calculate a desired carrier-to-interference ratio (CIR), from the ratio between the reception power in the connection request and connection response and the interference power from the short-range system 1350, which is received at a time of carrier sense. It should suffice if the IFS switching control is executed when the CIR has become lower than a threshold.

Immediately after the establishment of the communication link, since the IFS is Long IFS, priority is placed on the communication of the short-range system 1350, and data is transmitted from the access point to the short-range terminal. After the passing of a predetermined time, since the IFS of the near-field system 1300 changes to Short IFS, priority is placed on the communication of the near-field system 1300, and data can be transmitted from the near-field terminal 1 to the near-field terminal 2. Incidentally, since the transmission power in the near-field system 1300 has been increased, "carrier busy" can be observed in the short-range system 1350 from the transmission signal and the reception signal of the near-field system 1300, and thus the data transmission and data reception from the short-range system 1350 is caused to stand by.

According to the third embodiment described above, after the establishment of the communication link, the transmission power is increased and the switching control of IFS is executed. Thereby, the transmission power can be increased only when necessary for communication, interference with the other system can be suppressed, and an unnecessary power increase in the wireless communication apparatus can be suppressed, thereby realizing reduction in power consumption.

(Fourth Embodiment)

A fourth embodiment differs from the preceding embodiments in that, when the wireless communication apparatus is affected by interference even after the transmission power has been increased, the transmission power is further increased, or the frequency channel is changed.

Depending on the positional relationship between the near-field system and the short-range system and the degree of increase of the transmission power, there is a possibility that, even after the transmission power has been increased, the transmission signal and reception signal of the near-field system cannot be observed by the short-range system and the interference remains occurring.

By the above configuration, the near-field system can execute communication while avoiding interference from the short-range system.

Referring to a flowchart of FIG. 14, the operation of the wireless communication apparatus according to the fourth embodiment is described.

Since the process of step S501 to step S504 is the same as described above, a description thereof is omitted here.

In step S1401, the interference amount estimation amount 209 determines whether interference is a threshold or more, after the power transmission has been increased. When there is no interference, it is assumed that the communication is being normally executed. In order to continue the transmission/reception of data, the process goes back to step S501, and the same process is repeated. When there is interference, the process advances to step S1402.

In step S1402, the interference amount estimation amount 209 determines whether the transmission power has been increased a predetermined number of times or more. When the transmission power has been increased the predetermined number of times or more, the process goes to step S1403. If the transmission power has not been increased the predetermined number of times or more, the process goes back to step S501, and the same process is repeated.

In step S1403, the upper-layer processor 206 instructs a change of the frequency channel for use, and the modulator 208 changes the frequency channel. Alternatively, without increasing the transmission power a plural number of times, the transmission power may be increased once, and, if interference occurs thereafter, the channel may be changed.

Next, referring to FIG. 15, a description is given of a sequence chart of data transmission/reception in a case of increasing the transmission power in a stepwise manner.

In step S1501, it is assumed that in a near-field system 1500, data transmission and data reception have failed due to interference from a short-range system.

In step S1502, in the near-field system 1500, an instruction to increase the transmission power is generated by the interference estimation unit 801, the transmission power is increased, and data is transmitted. However, even after the transmission power has been increased, data transmission and reception of the near-field system 1500 cannot be observed in a short-range system 1550, the near-field system 1500 is affected by the interference from the short-range system 1550. Then, the interference estimation unit 801 calculates the carrier busy ratio and frame error ratio after the transmission power was once increased, and the transmission power is further increased if the carrier busy ratio and frame error ratio are no less than thresholds.

In step S1503, in the near-field system, data transmission and data reception are executed with transmission power which has been increased in two steps. In this case, since the transmission and reception signal with the two-step-increased transmission power could be observed in the short-range system 1550, "carrier busy" can be detected by the short-range system 1550. Thus, in the near-field system 1500, the data transmission and data reception can be completed.

Next, referring to FIG. 16, a description is given of a sequence chart of data transmission and data reception in a case of changing a frequency channel.

In step S1601, in a near-field system 1600, when there is interference from a short-range system 1650 even if the transmission power has been increased by one step in the near-field system 1600, as illustrated in step S1501 and step S1502, a channel change request is transmitted from the wireless communication apparatus of the near-field system 1600 to a wireless communication apparatus of the communication counterpart. The wireless communication apparatus of the communication counterpart receives the channel change request and transmits a response to the channel change request to the wireless communication apparatus.

In step S1602, the negotiation of the channel change is completed in the near-field system 1600, the channel that is used is changed from channel 1 to channel 2, and data is transmitted and received in channel 2. Thereby, in the near-field system 1600, data transmission and data reception can be executed without interference from the short-range system 1650.

According to the fourth embodiment described above, by increasing the transmission power in plural steps or changing the channel that is used, in accordance with the interference, transmission opportunities between the near-field system and the short-range system can be made equal, and data can be transmitted and received in the near-field system without interference from the short-range system.

(Fifth Embodiment)

In a fifth embodiment, in addition to the structure of the wireless communication apparatus illustrated in FIG. 2, the wireless communication apparatus further includes a buffer. The buffer may be provided in the transceiver. In addition, the buffer may be provided in a memory. By adopting this structure in which the buffer is incorporated in the wireless communication apparatus, transmission and reception frames can be stored in the buffer, and retransmission or external output processing can easily be performed.

(Sixth Embodiment)

In a sixth embodiment, in addition to the structure of the wireless communication apparatus according to the fifth embodiment, the wireless communication apparatus further includes a bus, a processer unit and an external interface unit. The processor unit and the external interface unit are connected to the buffer via the bus. Firmware operates in the processor unit. By adopting this structure in which the firmware is incorporated in the wireless communication apparatus, the functions of the wireless communication apparatus can easily be altered by rewriting the firmware.

(Seventh Embodiment)

In a seventh embodiment, in addition to the structure of the wireless communication apparatus illustrated in FIG. 2, the wireless communication apparatus further includes a clock generator. The clock generator generates a clock and outputs the clock to the outside of the wireless communication apparatus via an output terminal. In this manner, by outputting to the outside the clock generated within the wireless communication apparatus and causing the host to operate by the externally output clock, the host and the wireless communication apparatus can be made to operate in synchronism.

(Eighth Embodiment)

In an eighth embodiment, in addition to the structure of the wireless communication apparatus illustrated in FIG. 2, the wireless communication apparatus further includes, a power source unit, a power control unit and a wireless power feeding unit. The power control unit is connected to the power source unit and the wireless power feeding unit, and executes control to select the power source for supplying power to the wireless communication apparatus. By adopting this structure in which the power source is provided in the wireless communication apparatus, a low power consumption operation is realized with the power source controlled.

(Ninth Embodiment)

In a ninth embodiment, in addition to the structure of the wireless communication apparatus of the eighth embodiment, a near-field communication (NFC) transceiver is further included, and connected to the power control unit and the transceiver. By adopting this structure in which the NFC transceiver is included in the wireless communication apparatus, an authentication process can easily be executed, and the power consumption during a waiting time can be reduced by controlling the power source by using a signal received in the NFC transceiver as a trigger.

(Tenth Embodiment)

In a tenth embodiment, in addition to the structure of the wireless communication apparatus of the eighth embodiment, the wireless communication apparatus further includes a SIM card. The SIM card is connected to the transmission/reception module. By adopting this structure in which the SIM card is included in the wireless communication apparatus, an authentication process can easily be executed.

(Eleventh Embodiment)

In an eleventh embodiment, in addition to the structure of the wireless communication apparatus of the sixth embodiment, the wireless communication apparatus further includes a moving picture compression and decompression unit. The moving picture compression and decompression unit is connected to the bus. By adopting this structure in which the moving picture compression and decompression unit is included in the wireless communication apparatus, transmission of a compressed moving picture and decompression of a received compressed moving picture can easily be executed.

(Twelfth Embodiment)

In a twelfth embodiment, in addition to the structure of the wireless communication apparatus illustrated in FIG. 2, the wireless communication apparatus further includes an LED unit. The LED unit is connected to the wireless transceiver. By adopting this structure in which the LED unit is included in the wireless communication apparatus, notification of the operational state of the wireless communication apparatus can easily be made to a user.

(Thirteenth Embodiment)

In a thirteenth embodiment, in addition to the structure of the wireless communication apparatus illustrated in FIG. 2, the wireless communication apparatus further includes a vibrator. The vibrator is connected to the wireless transceiver. By adopting this structure in which the vibrator is included in the wireless communication apparatus, notification of the operational state of the wireless communication apparatus can easily be made to a user.

(Fourteenth Embodiment)

In a fourteenth embodiment, in addition to the structure of the wireless communication apparatus illustrated in FIG. 2, the wireless communication apparatus further includes a plurality of different PHY processors and a wireless switching unit. The wireless switching unit is connected to the plural different PHY processors, and executes switching between communications by the different PHY processors. By adopting this structure in which the different PHY processors are included in the wireless communication apparatus, switching can be made to the communication using a proper PHY processor in accordance with the situation.

(Fifteenth Embodiment)

In a fifteenth embodiment, in addition to the structure of the wireless communication apparatus illustrated in FIG. 2, the wireless communication apparatus further includes a plurality of different PHY processors, transmitting and receiving processors corresponding to these PHY processors, and a wireless switching unit. The wireless switching unit is so connected as to be able to switch the transmitting and receiving processors, and effects switching between a plurality of communication systems by the different transmitting and receiving processors and PHY processors. One of pairs of the transmitting and receiving processors and PHY processors corresponds to, for instance, wireless LAN. By adopting this structure in which the sets of the different transmitting and receiving processors and PHY processors are included in the wireless communication apparatus, switching can be made to the communication using a proper set of the transmitting and receiving processor and PHY processor in accordance with the situation.

(Sixteenth Embodiment)

In a sixteenth embodiment, in addition to the structure of the wireless communication apparatus of the fourteenth embodiment, the wireless communication apparatus further includes a switch (SW). The switch is connected to the antenna 201, a plurality of different PHY processors and a wireless switching unit. By adopting this structure in which the switch is included in the wireless communication apparatus, switching can be made to the communication using a proper PHY processor in accordance with the situation, while sharing the antenna.

(Seventeenth Embodiment)

In a seventeenth embodiment, in addition to the structure of the wireless communication apparatus of the fifteenth embodiment, the wireless communication apparatus further includes a switch (SW). The switch is connected to the antenna 201, transmission/reception processors and wireless switching module. By adopting this structure in which the switch is included in the wireless communication apparatus, switching can be made to the communication using a set of the proper transmission/reception processor and PHY processor in accordance with the situation, while sharing the antenna.

(Reference Examples)

FIG. 17 illustrates, as a reference example, a conventional example of data transmission and data reception in a case where short-range systems share a band.

In a short-range system 1, there occurred a request for successive transmission of several frames, and the short-range system 1 has performed data transmission (Data) by a predetermined frame length, and has received ACK (A). In a short-range system 2, there occurred a transmission request from an upper level at a time point described as "Transmission request", and starts carrier sense. At the time point described as "Transmission request", since the short-range system 1 is executing transmission/reception, the communication condition is "carrier busy". If the short-range system 1 completes Data-Ack and successive frame transmission and reception, the communication condition enters "carrier empty", and the short-range system 1, in which the transmission request remains, and the short-range system 2, in which a new transmission request has occurred, mutually enter the carrier sense state. In the transmission control by carrier sense, if the "carrier empty" continues for a probabilistically determined random time called back-off (BO), in addition to an inter frame space serving as a reference called IFS, a transmission right can be acquired and transmission can be executed. In FIG. 17, the short-range system 1 enters "carrier empty" after ending the transmission and reception, and both the short-range system 2 and the short-range system 2 enter the carrier sense state. In this case, since the back-off time of the short-range system 1 is shorter than that of the short-range system 2, the short-range system 1 acquires the transmission right once again and executes transmission and reception of Data-Ack. In the carrier sense state after the end of this transmission and reception, since the back-off time of the short-range system 2 is shorter, the short-range system 2 acquires a transmission right and executes data transmission and data reception. In general, since this back-off time is set at a random time with an identical probability distribution, the two short-range systems can equally share the identical frequency.

Next, FIG. 18 illustrates a sequence chart of data transmission and data reception of a short-range system and a near-field system in a case where the near-field system exists in the area A in FIG. 1.

In the area A, the short-range system and near-field system are disposed at remote positions. In addition, since the transmission/reception power of the near-field system is smaller than that of the short-range system by 10 dB or more, a signal of the near-field system does not reach the carrier sense level of the short-range system. Thus, with no interference, the short-range system executes carrier sense of IFS+BO, and can execute successive data transmission/reception. On the other hand, a signal from the short-range system to the near-field system can be observed on the near-field system side, since the transmission power of the short-range system is relatively large and the near-field system is disposed within the communication range of the short-range system. However, by setting the carrier sense level on the near-field system side to be higher than that of the short-range system, the carrier empty state can be set. Accordingly, without the signal from the short-range system affecting the carrier sense, the near-field system side, too, can successively execute data transmission/reception in accordance with the carrier sense result in the IFS+BO period. Although the signal from the short-range system exists as interference (I), since a desired signal (C) on the near-field system side is large, a desired CIR that is necessary for transmission/reception is satisfied. Thus, successive transmission/reception is enabled in both the short-range system and the near-field system.

Next, FIG. 19 illustrates a sequence chart of data transmission/reception in a short-range system and a near-field system in a case where the near-field system exists in the area C in FIG. 1.

In the area C, since the distance between the near-field system and the short-range system is short, both can execute carrier sense. Thus, in the same manner as between the short-range systems illustrated in FIG. 17, the band sharing by carrier sense is enabled. When there are transmission requests in both the short-range system and the near-field system, both systems perform carrier empty observation of the IFS+BO period after the end of transmission/reception of the short-range system in a first period. In a second period, since the BO period of the near-field system is short, the near-field system acquires a transmission right and starts transmission. After the end of transmission and reception of the near-field system in the second period, both the short-range system and near-field system perform once again carrier empty observation of the IFS+BO period. At this time, since the BO period of the short-range system is short, the short-range system acquires a transmission right and starts transmission. In this manner, since the carrier sense is mutually enabled in the area C, the band sharing based on the carrier sense is enabled.

Next, FIG. 20 illustrates a sequence chart of data transmission/reception in a short-range system and a near-field system in the area A in FIG. 1 in a case where the IFS of the near-field system is Short IFS.

In this case, since the distance between the short-range system and the near-field system is large, "carrier busy" does not occur in both systems. The short-range system performs carrier empty observation of the IFS+BO period, and then successively executes transmission and reception. In the near-field system, the carrier sense level is set to be higher than that of the short-range system. Thereby, without detecting "carrier busy" of the short-range system, the near-field system performs carrier empty observation of an IFS interval called "Short IFS", which is shorter than in the short-range system, and successively executes transmission and reception. In this manner, sharing can be executed between the short-range system and the near-field system.

Next, FIG. 21 illustrates a sequence chart of data transmission and data reception of a short-range system and a near-field system in the area C in FIG. 1 in a case where the IFS of the near-field system is switched between Short IFS and Long IFS.

As illustrated in FIG. 21, the IFS interval is alternately switched between Long IFS and Short IFS at regular intervals. At this time, the Short IFS is set to be a shorter time than the IFS of the short-range system, and the Long IFS is set to be a longer time than the IFS of the short-range system. In the Long IFS period, in many cases, the IFS+BO period of the short-range system becomes probabilistically shorter, and thus there are many cases in which the short-range system acquires a transmission right. In the Short IFS period, the Short IFS period of the near-field system is shorter, and the near-field system acquires a transmission right. In FIG. 21, since the end of a first communication period coincides with a Long IFS period, the short-range system and near-field system perform carrier empty observation with IFS+BO and Long IFS, respectively. Since the IFS+BO period is shorter, the short-range system acquires a transmission right. The end of a second communication period coincides with a Short IFS period, and the near-field system, which executes carrier sense with Short IFS, acquires a transmission right of a third communication period. Since the end of the third communication period still coincides with the Short IFS, the near-field system successively acquires a transmission right of a fourth communication period. At the end of the fourth communication period, since the IFS period changes back to the Long IFS period, the short-range system preferentially acquires a transmission right at this time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
a transceiver configured to transmit and receive a frame in a first frequency band using a first communication scheme;
an estimator configured to determine whether or not an amount of interference in the first frequency band from another device is no less than a threshold, the another device executing communication using a second communication scheme different from the first communication scheme, and a first communication range of the first communication scheme being smaller than a second communication range of the second communication scheme; and
a controller configured to increase a transmission power when the amount of interference is no less than the threshold.

2. The apparatus according to claim 1, wherein the estimator is configured to estimate the amount of interference from the another device, based on a busy ratio indicating a congestion condition of communication in the first frequency band, and an error ratio at a time of receiving the frame.

3. The apparatus according to claim 1, further comprising a switching unit configured to control, when the amount of interference is no less than the threshold, an inter frame space by switching between a first inter frame space set and a second inter frame space set, the first inter frame space set including at least one inter frame space, and the second inter frame space set including at least one inter frame space and including at least one inter frame space which is longer than a maximum inter frame space included in the first inter frame space set.

4. The apparatus according to claim 3, wherein an amount of increase of the transmission power and a timing of effecting switching between the first inter frame space set and the second inter frame space set are controlled in accordance with a predetermined algorithm.

5. The apparatus according to claim 3, wherein a timing of effecting switching between the first inter frame space set and the second inter frame space set is controlled in accordance with a predetermined pattern.

6. The apparatus according to claim 1, wherein the controller is configured to increase the transmission power after a communication link has been established.

7. The apparatus according to claim 1, further comprising a modulator configured to change from the first frequency band to a second frequency band if the amount of interference is no less than the threshold after the transmission power has been increased.

8. The apparatus according to claim 1, wherein the controller is configured to increase the transmission power, if the amount of interference is no less than the threshold after the transmission power has been increased.

9. The apparatus according to claim 1, further comprising at least one antenna for transmitting and receiving a wireless signal including the frame.

10. The apparatus according to claim 1, wherein the first communication range is determined by a first transmission power and a first antenna gain, and the second communication range is determined by a second transmission power greater than the first transmission power and a second antenna gain.

11. The apparatus according to claim 1, wherein the first communication scheme is a near-field system, and the second communication scheme is a short-range system.

12. A wireless communication method comprising:
transmitting and receiving a frame in a first frequency band using a first communication scheme;
determining whether or not an amount of interference in the first frequency band from another device is no less than a threshold, the another device executing communication using a second communication scheme different from the first communication scheme, and a first communication range of the first communication scheme being smaller than a second communication range of the second communication scheme; and
increasing a transmission power when the amount of interference is no less than the threshold.

13. The method according to claim 12, wherein the determining estimates the amount of interference from the another device, based on a busy ratio indicating a congestion condition of communication in the first frequency band, and an error ratio at a time of receiving the frame.

14. The method according to claim 12, further comprising controlling, when the amount of interference is no less than the threshold, an inter frame space by switching between a first inter frame space set and a second inter frame space set, the first inter frame space set including at least one inter frame space, and the second inter frame space set including at least one inter frame space and including at least one inter frame space which is longer than a maximum inter frame space included in the first inter frame space set.

15. The method according to claim 12, wherein the increasing the transmission power increases the transmission power after a communication link has been established.

16. The method according to claim 12, further comprising changing from the first frequency band to a second frequency band if the amount of interference is no less than the threshold after the transmission power has been increased.

17. The method according to claim 12, wherein the increasing the transmission power further increases the transmission power, the amount of interference is no less than the threshold after the transmission power has been increased.

18. The method according to claim 12, further comprising transmitting and receiving a wireless signal including the frame.

19. The method according to claim 12, wherein the first communication range is determined by a first transmission power and a first antenna gain, and the second communication range is determined by a second transmission power greater than the first transmission power and a second antenna gain.

20. The method according to claim 12, wherein the first communication scheme is a near-field system, and the second communication scheme is a short-range system.

* * * * *